United States Patent
Xu et al.

(10) Patent No.: US 12,132,197 B2
(45) Date of Patent: Oct. 29, 2024

(54) BATTERY PACK AND POWER CONSUMING DEVICE

(71) Applicant: CONTEMPORARY AMPEREX TECHNOLOGY (HONG KONG) LIMITED, Hong Kong (CN)

(72) Inventors: Baoyun Xu, Ningde (CN); Shaocong Ouyang, Ningde (CN); Chenghua Fu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 76 days.

(21) Appl. No.: 17/968,887

(22) Filed: Oct. 19, 2022

(65) Prior Publication Data
US 2023/0126948 A1    Apr. 27, 2023

Related U.S. Application Data

(63) Continuation of application No. PCT/CN2021/126409, filed on Oct. 26, 2021.

(51) Int. Cl.
*H01M 4/36* (2006.01)
*H01M 4/485* (2010.01)
(Continued)

(52) U.S. Cl.
CPC .......... *H01M 4/364* (2013.01); *H01M 4/485* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| | | | | |
|---|---|---|---|---|
| 2012/0015223 A1* | 1/2012 | Bhardwaj | ........... | H01M 10/052 429/94 |
| 2014/0162112 A1 | 6/2014 | Ugaji et al. | | |

(Continued)

FOREIGN PATENT DOCUMENTS

| | | |
|---|---|---|
| CN | 103582963 A | 2/2014 |
| CN | 111446488 A | 7/2020 |

(Continued)

OTHER PUBLICATIONS

International Search Report issued Jul. 27, 2022 in International Patent Application No. PCT/CN2021/126409 with English translation thereof.

(Continued)

*Primary Examiner* — Carlos Barcena
(74) *Attorney, Agent, or Firm* — XSENSUS LLP

(57) ABSTRACT

A battery pack may include a battery pack case and battery cells accommodated in the battery pack case; the inner space of the battery pack case may include a first area, a second area, a third area, and a fourth area; a first battery cell may be provided in the first area, a second battery cell may be provided in the second area, a third battery cell may be provided in the third area, and a fourth battery cell may be provided in the fourth area; and the first battery cell, the second battery cell, the third battery cell, and the fourth battery cell each have a first discharge voltage plateau and a second discharge voltage plateau, and an average discharge voltage in the first discharge voltage plateau may be higher than an average discharge voltage in the second discharge voltage plateau.

20 Claims, 2 Drawing Sheets

(51) Int. Cl.
  *H01M 4/505* (2010.01)
  *H01M 4/525* (2010.01)
  *H01M 4/58* (2010.01)
  *H01M 10/42* (2006.01)
  *H01M 50/204* (2021.01)
  *H01M 4/02* (2006.01)

(52) U.S. Cl.
  CPC ..... *H01M 4/5825* (2013.01); *H01M 10/4264* (2013.01); *H01M 50/204* (2021.01); *H01M 2004/028* (2013.01); *H01M 2220/20* (2013.01)

(56) References Cited

U.S. PATENT DOCUMENTS

2015/0188188 A1* 7/2015 Zhang .................. H01M 4/131
  429/9
2017/0346089 A1* 11/2017 Yamamoto ............ H01M 10/48
2020/0381928 A1* 12/2020 Isaksson ............. H01M 10/658
2021/0194079 A1  6/2021 Bi et al.

FOREIGN PATENT DOCUMENTS

CN    212625786 U    2/2021
CN    112599891 A    4/2021

OTHER PUBLICATIONS

Written Opinion issued issued Jul. 27, 2022 in International Patent Application No. PCT/CN2021/126409 with English translation thereof.
Extended European Search Report issued Aug. 7, 2023 in European Patent Application No. 21936242.3.
Office Action issued Jan. 16, 2024 in Japanese Patent Application No. 2022-567558 with English translation thereof.

* cited by examiner

BATTERY PACK AND POWER CONSUMING DEVICE

CROSS-REFERENCE TO RELATED APPLICATIONS

This application is a continuation of International Application No. PCT/CN2021/126409, filed Oct. 26, 2021, which is incorporated herein by reference in its entirety.

TECHNICAL FIELD

The present application relates to the field of lithium-ion batteries, and in particular, to a battery pack with a high low-temperature energy retention rate and a power consuming device including the battery pack.

BACKGROUND ART

In recent years, with the continuous development of lithium-ion battery technologies, lithium-ion batteries are widely used in energy storage power systems such as hydroelectric, thermal, wind and solar power plants, as well as electric tools, electric bicycles, electric motorcycles, electric vehicles, military equipment, aerospace and other fields. In the above fields, a capacity of a lithium-ion secondary battery cell occasionally cannot meet usage requirements, and in this case, a plurality of lithium-ion secondary battery cells need to be connected in series or in parallel to form a battery pack. The lithium-ion secondary battery cells used in the battery pack mainly include a ternary battery such as a lithium nickel manganese cobalt oxide battery, a lithium nickel cobalt aluminium oxide battery, or the like, a lithium iron phosphate battery, a lithium manganese oxide battery, a lithium cobalt oxide battery, a lithium titanate battery, a manganese dioxide battery, and the like.

However, when the battery pack composed of lithium-ion secondary battery cells is used in a low-temperature environment such as in winter, an energy retention rate of the battery pack is greatly reduced, that is, the low-temperature endurance of the battery pack is severely reduced. How to improve the overall low-temperature endurance of the battery pack has become a key issue that needs to be solved urgently. Therefore, a low-temperature energy retention rate of an existing battery pack composed of lithium-ion secondary battery cells still needs to be increased.

SUMMARY OF THE DISCLOSURE

The present application is provided in view of the above technical problems, and one objective of the present application is to provide a battery pack that is composed of lithium-ion secondary batteries and has an excellent low-temperature energy retention rate and improved low-temperature endurance and a power consuming device including the battery pack.

In order to achieve the above objective or other objectives, a first aspect of the present application provides a battery pack including a battery pack case and battery cells accommodated in the battery pack case, where the battery pack is characterized in that: in a top view, an inner space of the battery pack case is in a rectangular shape; the inner space of the battery pack case is composed of a first area, a second area, a third area, and a fourth area, in the top view, the first area is located at the center of the rectangular shape of the inner space, the fourth area is located at the four corners of the rectangular shape of the inner space, the third area is located on the four sides of the rectangular shape of the inner space except the corners, and the second area is located between the first area and the third area; a first battery cell is provided in the first area, a second battery cell is provided in the second area, a third battery cell is provided in the third area, and a fourth battery cell is provided in the fourth area; in the top view, the second battery cell is not in contact with any inner surface of the battery pack case, the third battery cell is in contact with only one inner surface of the battery pack case, and the fourth battery cell is in contact with two inner surfaces of the battery pack case; the first battery cell, the second battery cell, the third battery cell, and the fourth battery cell each have a first discharge voltage plateau and a second discharge voltage plateau, and an average discharge voltage in the first discharge voltage plateau is higher than an average discharge voltage in the second discharge voltage plateau; and in each of the first battery cell, the second battery cell, the third battery cell, and the fourth battery cell, when the sum of a discharge capacity corresponding to the first discharge voltage plateau and a discharge capacity corresponding to the second discharge voltage plateau is 100%, a percentage of the discharge capacity corresponding to the second discharge voltage plateau of the fourth battery cell>a percentage of the discharge capacity corresponding to the second discharge voltage plateau of the third battery cell>a percentage of the discharge capacity corresponding to the second discharge voltage plateau of the second battery cell>a percentage of the discharge capacity corresponding to the second discharge voltage plateau of the first battery cell.

Therefore, in some embodiments of the present application, the battery cells with different low-temperature discharge capabilities are provided in the battery pack based on temperature distribution inside the battery pack, thereby increasing an overall low-temperature energy retention rate of the battery pack. Specifically, the battery cells with different low-temperature energy retention rates and each having two discharge voltage plateaus (the first discharge voltage plateau with a higher discharge voltage and the second discharge voltage plateau with a lower discharge voltage) are respectively provided in the areas with different temperatures in the inner space of the battery pack case, and the battery cells with higher low-temperature energy retention rates are respectively provided in the areas with lower temperatures. By providing the battery cells with relatively low low-temperature performance (a relatively low low-temperature energy retention rate) in the areas with relatively high temperatures in the inner space of the battery pack case and the battery cells with relatively high low-temperature performance (a relatively high low-temperature energy retention rate) in the areas with relatively low temperatures in the inner space of the battery pack case, cycling consistency of the battery cells respectively provided in the areas with different temperatures inside the battery pack can be improved, and the overall low-temperature energy retention rate of the battery pack can be increased, thereby improving overall low-temperature endurance of the battery pack.

The "rectangular shape" described in the present application is not limited to a strictly rectangular shape, and may be a substantially rectangular shape. "Being in contact with an inner surface of the battery pack case" includes a case of "being in contact with a structural member provided on the inner surface of the battery pack case".

In one implementation, in each of the first battery cell, the second battery cell, the third battery cell, and the fourth battery cell, a difference between a minimum discharge voltage in the first discharge voltage plateau and a maximum discharge voltage in the second discharge voltage plateau ranges from 0.25 V to 0.6 V.

Therefore, after discharge is performed by utilizing the first discharge voltage plateau with a higher discharge voltage, the discharge continues to be performed by further utilizing the second discharge voltage plateau with a lower discharge voltage, which can increase energy that each battery cell can release at a low temperature, thereby increasing the overall low-temperature energy retention rate of the battery pack.

In one implementation, in the first battery cell, when the sum of the discharge capacity corresponding to the first discharge voltage plateau and the discharge capacity corresponding to the second discharge voltage plateau is 100%, the discharge capacity corresponding to the first discharge voltage plateau accounts for 91.8% to 99%, and the discharge capacity corresponding to the second discharge voltage plateau accounts for 1% to 8.2%.

Therefore, by making the percentages of the discharge capacity corresponding to the first discharge voltage plateau and the discharge capacity corresponding to the second discharge voltage plateau of the first battery cell be respectively within the above ranges, energy that the first battery cell can release at a low temperature can be increased, thereby increasing the overall low-temperature energy retention rate of the battery pack.

In one implementation, in the second battery cell, when the sum of the discharge capacity corresponding to the first discharge voltage plateau and the discharge capacity corresponding to the second discharge voltage plateau is 100%, the discharge capacity corresponding to the first discharge voltage plateau accounts for 75.7% to 96.8%, and the discharge capacity corresponding to the second discharge voltage plateau accounts for 3.2% to 24.3%.

Therefore, by making the percentages of the discharge capacity corresponding to the first discharge voltage plateau and the discharge capacity corresponding to the second discharge voltage plateau of the second battery cell be respectively within the above ranges, energy that the second battery cell can release at a low temperature can be increased, thereby further increasing the overall low-temperature energy retention rate of the battery pack.

In one implementation, in the third battery cell, when the sum of the discharge capacity corresponding to the first discharge voltage plateau and the discharge capacity corresponding to the second discharge voltage plateau is 100%, the discharge capacity corresponding to the first discharge voltage plateau accounts for 60.2% to 89.4%, and the discharge capacity corresponding to the second discharge voltage plateau accounts for 10.6% to 39.8%.

Therefore, by making the percentages of the discharge capacity corresponding to the first discharge voltage plateau and the discharge capacity corresponding to the second discharge voltage plateau of the third battery cell be respectively within the above ranges, energy that the third battery cell can release at a low temperature can be increased, thereby further increasing the overall low-temperature energy retention rate of the battery pack.

In one implementation, in the fourth battery cell, when the sum of the discharge capacity corresponding to the first discharge voltage plateau and the discharge capacity corresponding to the second discharge voltage plateau is 100%, the discharge capacity corresponding to the first discharge voltage plateau accounts for 52.5% to 80.3%, and the discharge capacity corresponding to the second discharge voltage plateau accounts for 19.7% to 47.5%.

Therefore, by making the percentages of the discharge capacity corresponding to the first discharge voltage plateau and the discharge capacity corresponding to the second discharge voltage plateau of the fourth battery cell be respectively within the above ranges, energy that the fourth battery cell can release at a low temperature can be increased, thereby further increasing the overall low-temperature energy retention rate of the battery pack.

In one implementation, a positive electrode active material of each of the first battery cell, the second battery cell, the third battery cell, and the fourth battery cell is formed by mixing a first positive electrode active material with the first discharge voltage plateau and a second positive electrode active material with the second discharge voltage plateau.

Therefore, the first battery cell, the second battery cell, the third battery cell, and the fourth battery cell each have the first discharge voltage plateau and the second discharge voltage plateau with different discharge voltages, and after discharge is performed by utilizing the first discharge voltage plateau with a higher discharge voltage, the discharge continues to be performed by further utilizing the second discharge voltage plateau with a lower discharge voltage, thereby improving respective low-temperature performance of the first battery cell, the second battery cell, the third battery cell, and the fourth battery cell.

In one implementation, each of the first positive electrode active material and the second positive electrode active material is selected from at least one of: lithium nickelate, lithium cobalt oxide, lithium nickel manganese cobalt oxide, lithium nickel cobalt aluminium oxide, lithium iron phosphate, lithium manganese oxide, lithium titanate, and manganese dioxide.

Therefore, the first positive electrode active material and the second positive electrode active material may be selected from various existing positive electrode active materials, as long as the discharge voltages in and the discharge capacity percentages of the first discharge voltage plateau generated by the first positive electrode active material and the second discharge voltage plateau generated by the second positive electrode active material respectively meet the above relationships, so that the battery pack of the present application can be easily implemented by utilizing the existing positive electrode active materials.

In one implementation, the first positive electrode active material is lithium nickel manganese cobalt oxide, and the second positive electrode active material is lithium iron phosphate; or the first positive electrode active material is lithium nickel manganese cobalt oxide, and the second positive electrode active material is lithium manganese oxide or lithium titanate; or the first positive electrode active material is lithium iron phosphate, and the second positive electrode active material is lithium manganese oxide or lithium titanate.

The size order of voltage plateaus and specific energy is basically as follows: lithium nickel manganese cobalt oxide>lithium iron phosphate>lithium manganese oxide or lithium titanate. Therefore, relatively speaking, the value order of energy densities is as follows: lithium nickel manganese cobalt oxide+lithium iron phosphate>lithium nickel manganese cobalt oxide+lithium manganese oxide or lithium titanate>lithium iron phosphate+lithium manganese oxide or lithium titanate. Correspondingly, in a module or battery pack of the same volume, the order of endurance mileages of the above three systems is as follows: lithium nickel manganese cobalt oxide+lithium iron phosphate>lithium nickel manganese cobalt oxide+lithium manganese oxide or lithium titanate>lithium iron phosphate+lithium manganese oxide or lithium titanate. Therefore, lithium nickel manganese cobalt oxide+lithium iron phosphate is more applicable to scenarios requiring relatively high endurance mileages or relatively large output power; lithium nickel manganese cobalt oxide+lithium manganese oxide or lithium titanate is applicable to scenarios requiring moderate endurance mileages or moderate output power; and the system of lithium iron phosphate+lithium manganese oxide or lithium titanate is more applicable to low-speed mobility scooters and other scenarios with low output power requirements.

In one implementation, when the first positive electrode active materials and the second positive electrode active materials in the first battery cell, the second battery cell, the third battery cell, and the fourth battery cell are both of the same type, respective mass percentages of the first positive electrode active materials in the positive electrode active materials of the first battery cell, the second battery cell, the third battery cell, and the fourth battery cell decrease successively, and respective mass percentages of the second positive electrode active materials in the positive electrode active materials of the first battery cell, the second battery cell, the third battery cell, and the fourth battery cell increase successively.

The larger the mass percentage of the second positive electrode active material used to generate the second discharge voltage plateau with a lower discharge voltage, the greater the percentage of the discharge capacity corresponding to the second discharge voltage plateau, and the higher the low-temperature energy retention rate of the battery cell. By making the mass percentage of the second positive electrode active material of the fourth battery cell provided in the fourth area>the mass percentage of the second positive electrode active material of the third battery cell provided in the third area>the mass percentage of the second positive electrode active material of the second battery cell provided in the second area>the mass percentage of the second positive electrode active material of the first battery cell provided in the first area, the low-temperature energy retention rate of the fourth battery cell>the low-temperature energy retention rate of the third battery cell>the low-temperature energy retention rate of the second battery cell>the low-temperature energy retention rate of the first battery cell, and energy released at a low temperature by the first battery cell, the second battery cell, the third battery cell, and the fourth battery cell can be approximately the same, thereby further increasing the overall low-temperature energy retention rate of the battery pack.

In one implementation, in the first battery cell, when the total mass of the first positive electrode active material and the second positive electrode active material is 100%, the mass of the first positive electrode active material accounts for 92.5% to 97.5%, and the mass of the second positive electrode active material accounts for 2.5% to 7.5%.

Therefore, by making the mass percentages of the first positive electrode active material and the second positive electrode active material in the first battery cell be respectively within the above ranges, the percentages of the discharge capacity corresponding to the first discharge voltage plateau and the discharge capacity corresponding to the second discharge voltage plateau of the first battery cell can be respectively within the above ranges, and energy that the first battery cell can release at a low temperature can be increased, thereby increasing the overall low-temperature energy retention rate of the battery pack.

In one implementation, in the second battery cell, when the total mass of the first positive electrode active material and the second positive electrode active material is 100%, the mass of the first positive electrode active material accounts for 77.5% to 92.5%, and the mass of the second positive electrode active material accounts for 7.5% to 22.5%.

Therefore, by making the mass percentages of the first positive electrode active material and the second positive electrode active material in the second battery cell be respectively within the above ranges, the percentages of the discharge capacity corresponding to the first discharge voltage plateau and the discharge capacity corresponding to the second discharge voltage plateau of the second battery cell can be respectively within the above ranges, and energy that the second battery cell can release at a low temperature can be increased, thereby further increasing the overall low-temperature energy retention rate of the battery pack.

In one implementation, in the third battery cell, when the total mass of the first positive electrode active material and the second positive electrode active material is 100%, the mass of the first positive electrode active material accounts for 62.5% to 77.5%, and the mass of the second positive electrode active material accounts for 22.5% to 37.5%.

Therefore, by making the mass percentages of the first positive electrode active material and the second positive electrode active material in the third battery cell be respectively within the above ranges, the percentages of the discharge capacity corresponding to the first discharge voltage plateau and the discharge capacity corresponding to the second discharge voltage plateau of the third battery cell can be respectively within the above ranges, and energy that the third battery cell can release at a low temperature can be increased, thereby further increasing the overall low-temperature energy retention rate of the battery pack.

In one implementation, in the fourth battery cell, when the total mass of the first positive electrode active material and the second positive electrode active material is 100%, the mass of the first positive electrode active material accounts for 50% to 62.5%, and the mass of the second positive electrode active material accounts for 37.5% to 50%.

Therefore, by making the mass percentages of the first positive electrode active material and the second positive electrode active material in the fourth battery cell be respectively within the above ranges, the percentages of the discharge capacity corresponding to the first discharge voltage plateau and the discharge capacity corresponding to the second discharge voltage plateau of the fourth battery cell can be respectively within the above ranges, and energy that the fourth battery cell can release at a low temperature can be increased, thereby further increasing the overall low-temperature energy retention rate of the battery pack.

In one implementation, when the first positive electrode active material is lithium nickel manganese cobalt oxide, and the second positive electrode active material is lithium iron phosphate, a mass ratio of the second positive electrode active material in the first battery cell to that in the second battery cell, that in the third battery cell, and that in the fourth battery cell is 1:(1-3):(3-5):(5-9); when the first positive electrode active material is lithium nickel manganese cobalt oxide, and the second positive electrode active material is lithium titanate or lithium manganese oxide, a mass ratio of the second positive electrode active material in the first battery cell to that in the second battery cell, that in the third battery cell, and that in the fourth battery cell is 1:(1-2):(3-4):(5-7); and when the first positive electrode active material is lithium iron phosphate, and the second positive electrode active material is lithium titanate or lithium manganese oxide, a mass ratio of the second positive electrode active material in the first battery cell to that in the second battery cell, that in the third battery cell, and that in the fourth battery cell is 1:(1-3):(3-5):(5-9).

Therefore, by using the specific first positive electrode active material and the specific second positive electrode active material in a specific mass ratio in each of the first battery cell, the second battery cell, the third battery cell, and the fourth battery cell, the battery pack of the present application applicable to different scenarios can be easily implemented.

In one implementation, at a temperature below 0° C., a discharge cut-off voltage of the first battery cell is higher than a discharge cut-off voltage of the second battery cell by 0 V to 0.3 V, the discharge cut-off voltage of the second battery cell is higher than a discharge cut-off voltage of the third battery cell by 0 V to 0.3 V, the discharge cut-off voltage of the third battery cell is higher than a discharge cut-off voltage of the fourth battery cell by 0 V to 0.3 V, and the discharge cut-off voltage of the fourth battery cell is 1.6 V or more.

Therefore, by setting the discharge cut-off voltages of the first battery cell, the second battery cell, the third battery cell, and the fourth battery cell as described above, energy released at a low temperature by the first battery cell, the second battery cell, the third battery cell, and the fourth battery cell can be approximately the same, so that the overall low-temperature energy retention rate of the battery pack can be increased.

In one implementation, a ratio of the number of first battery cells to that of second battery cells, that of third battery cells, and that of fourth battery cells is (3-8):(8-13):(9-14): 1. In other words, when the sum of the number of first battery cells, the number of second battery cells, the number of third battery cells, and the number of fourth battery cells is 100%, the number of first battery cells accounts for 10% to 30%, the number of second battery cells accounts for 25% to 50%, the number of third battery cells accounts for 30% to 55%, and the number of fourth battery cells accounts for 2% to 5%.

Therefore, the battery pack of the present application can be easily implemented as long as the numbers of first battery cells, second battery cells, third battery cells, and fourth battery cells are set based on a common temperature distribution range of the battery pack.

In one implementation, a capacitor is provided in a gap between different battery cells.

Therefore, the gap between the battery cells can be fully utilized to increase the overall volume energy density of the battery pack.

A second aspect of the present application provides a power consuming device including the battery pack in the first aspect of the present application.

Therefore, the power consuming device in the second aspect of the present application has strong low-temperature endurance, and can be used normally for a long time even at a low temperature.

Disclosure Effects

According to some embodiments of the present disclosure, by respectively providing the battery cells each having two discharge voltage plateaus and with different low-temperature energy retention rates in the areas with different temperatures inside the battery pack case, the battery pack where energy released at a low temperature by the battery cells respectively provided in the areas with different temperatures can be approximately the same and whose overall low-temperature energy retention rate can be increased and the power consuming device including the battery pack can be provided.

LIST OF REFERENCE NUMERALS

Figure 1:
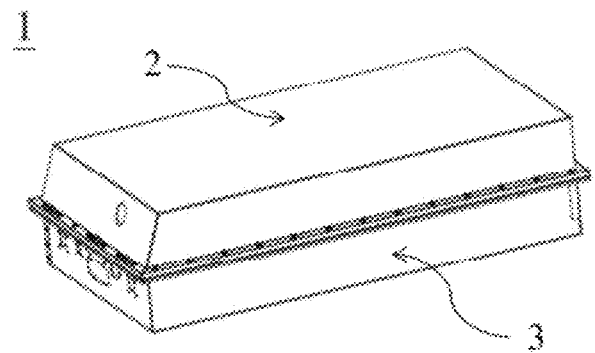
FIG. 1 is a schematic structural diagram of a battery pack according to an implementation of the present application.

1—battery pack; 2—upper case body; 3—lower case body; g1 and g2—gaps; C11 and C12—capacitors; BL1—first boundary line; BL2—second boundary line; BL3—third boundary line; BL4—fourth boundary line; R1—first area; R2—second area; R3—third area; R4—fourth area; 61—first battery cell; 62—second battery cell; 63—third battery cell; 64—fourth battery cell.

DETAILED DESCRIPTION OF EMBODIMENTS

Hereafter, implementations of the battery pack and the power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed herein are defined in the form of lower and upper limits, where a given range is defined by the selection of a lower limit and an upper limit, and the selected lower and upper limits define the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3,1-4,1-5,2-3,2-4, and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer being ≥2, it is equivalent to disclosing that the parameter is, for example, an integer of 2, 3, 4, 5, 6, 7, 8, 9, 10, 11, 12, or the like.

All the implementations and optional implementations of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), or steps (c), (a) and (b).

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

The inventors noticed that when a battery pack composed of lithium-ion secondary battery cells is used in a low-temperature environment in winter, due to different heat dissipation capabilities and thermal insulation effects of battery cells at different positions inside the battery pack, charge and discharge performance of the battery cells at different positions is inconsistent. Specifically, when the battery pack is used in a low-temperature environment, battery cells located on an inner side inside the battery pack have a higher temperature and better low-temperature discharge performance, while battery cells located on an outer side inside the battery pack have a lower temperature and poorer low-temperature discharge performance. A difference in low-temperature discharge capabilities of the battery cells at different positions inside the battery pack leads to a significant decrease in an overall low-temperature energy retention rate of the battery pack.

Therefore, the inventors thought that by providing battery cells with better low-temperature discharge performance in an area with a lower temperature inside the battery pack, energy released by the battery cells at different positions inside the battery pack in a low-temperature environment can be approximately the same, and the overall energy performance of the battery pack in a low-temperature environment can be improved, thereby further improving the endurance mileage, in a low-temperature environment, of a power consuming device using the battery pack as a power source.

In order to achieve the above objectives, the inventors have conducted repeated research and found that, by making each of battery cells provided in the areas with lower temperatures have two discharge voltage plateaus, after discharge performed in the discharge voltage plateau with a higher discharge voltage is completed, the discharge continues to be performed by further utilizing the discharge voltage plateau with a lower discharge voltage, which can increase discharge capacities of these battery cells, so that low-temperature discharge performance of these battery cells is better.

Moreover, when the mass of a positive electrode active material for the discharge voltage plateau with a lower discharge voltage accounts for no more than 50% of the total mass of positive electrode active materials for the discharge voltage plateau with a higher discharge voltage and the discharge voltage plateau with a lower discharge voltage, a discharge capacity corresponding to the discharge voltage plateau with a lower discharge voltage accounts for a higher percentage of the total discharge capacity corresponding to the discharge voltage plateau with a higher discharge voltage and the discharge voltage plateau with a lower discharge voltage, and low-temperature performance of the battery cell is better. In this way, by using the battery cells with discharge voltage plateaus with a lower discharge voltage corresponding to higher discharge capacity percentages in the areas with lower temperatures, energy released at a low temperature by the battery cells respectively provided in the areas with different temperatures can be approximately the same, and an overall low-temperature energy retention rate of the battery pack can be increased, thereby improving low-temperature endurance of electric vehicles and other power consuming devices using the battery pack as a power source.

Battery Pack

Next, a battery pack 1 of the present application will be specifically described.

Figure 2:
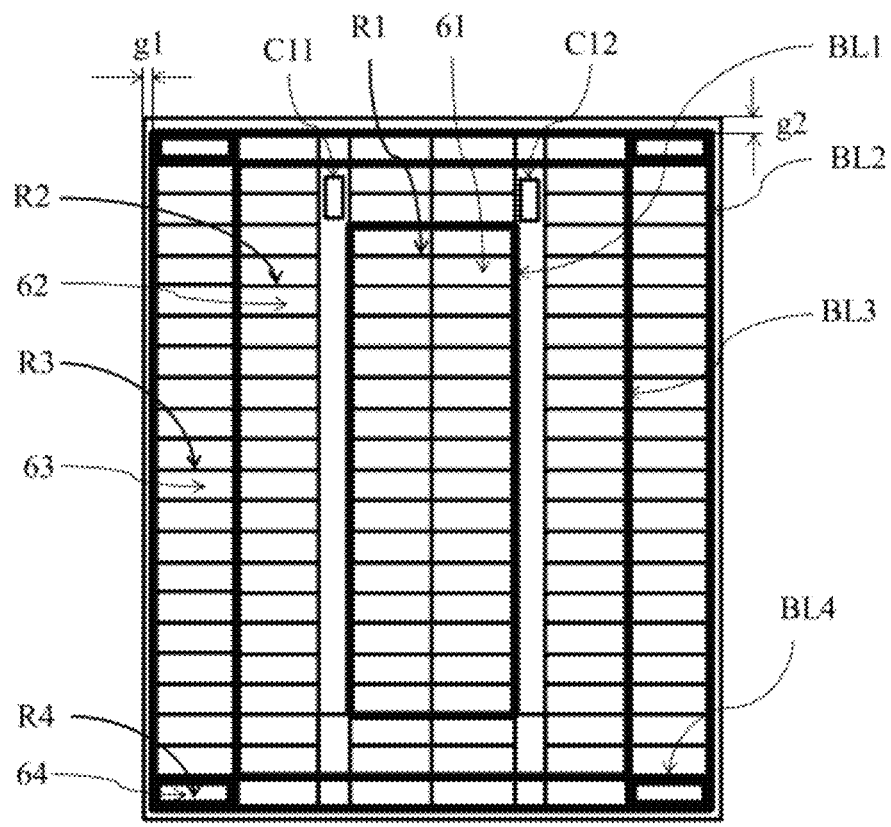
FIG. 2 is a top view of structural components of the battery pack, with its case removed, shown in FIG. 1 according to an implementation of the present application.

FIG. 1 is a schematic structural diagram of the battery pack 1 according to an implementation of the present application. FIG. 2 is a top view of structural components of the battery pack 1, with its case removed, shown in FIG. 1.

As shown in FIG. 1 and FIG. 2, the battery pack 1 of the present application includes a battery pack case and a plurality of battery cells (61, 62, 63, and 64) provided in the battery pack case. The battery pack case includes an upper case body 2 and a lower case body 3. The upper case body 2 can cover the lower case body 3 to form an enclosed space (a battery pack cavity) for accommodating the plurality of battery cells.

As shown in FIG. 2, the outermost battery cells of the plurality of battery cells may be in contact with the inner surfaces of the battery pack case (the upper case body 2 and the lower case body 3), or may be in contact with structural members provided on the inner surfaces of the battery pack case. In the top view shown in FIG. 2, gaps g1 and g2 are optionally formed between the outermost battery cells and the inner surfaces of the battery pack case, and various structural members of the battery pack may be provided in the gaps g1 and g2. In gaps between different battery cells, capacitors C11, C12, and the like may be optionally provided, to improve the overall energy density of the battery pack.

Specific positions and the number of battery cells included in the battery pack 1 may be selected according to actual application of the battery pack.

As shown in FIG. 2, the battery pack 1 includes a battery pack case and battery cells 61, 62, 63, and 64 accommodated in the battery pack case. In the top view of the battery pack 1 shown in FIG. 2, an inner space of the battery pack case is in a rectangular shape, and is composed of a first area R1, a second area R2, a third area R3, and a fourth area R4. In the top view, the first area R1 is located at the center of the rectangular shape of the inner space, the fourth area R4 is located at the four corners of the rectangular shape of the inner space, the third area R3 is located on the four sides of the rectangular shape of the inner space except the corners, and the second area R2 is located between the first area R1 and the third area R3. The first area R1 is a substantially rectangular area enclosed by a first boundary line BL1, and is located at the center of the rectangular shape of the inner space of the battery pack case (for example, the length and width of the rectangular shape of the first area R1 may be respectively approximately halves of the length and width of the rectangular shape of the inner space of the battery pack case). The fourth area R4 is an area enclosed by a fourth boundary line BL4, and is located at the four corners of the rectangular shape of the inner space of the battery pack case. The third area R3 is located on the four sides of the rectangular shape of the inner space of the battery pack case except the corners. The second area R2 is a substantially annular area defined by the first boundary line BL1 and the third boundary line BL3 (that is, located between the first area R1 and the third area R3). The first boundary line BL1, the second boundary line BL2, the third boundary line BL3, and the fourth boundary line BL4 are imaginary lines drawn to clearly define the first area R1, the second area R2, the third area R3, and the fourth area R4.

Further, a first battery cell 61 is provided in the first area R1, a second battery cell 62 is provided in the second area R2, a third battery cell 63 is provided in the third area R3, and a fourth battery cell 64 is provided in the fourth area R4. In the top view, the second battery cell 62 is not in contact with any inner surface of the battery pack case, the third battery cell 63 is in contact with only one inner surface of the battery pack case, and the fourth battery cell 64 is in contact with two inner surfaces of the battery pack case. The first battery cell 61, the second battery cell 62, the third battery cell 63, and the fourth battery cell 64 each have a first discharge voltage plateau and a second discharge voltage plateau, and an average discharge voltage in the first discharge voltage plateau is higher than an average discharge voltage in the second discharge voltage plateau. In each of the first battery cell 61, the second battery cell 62, the third battery cell 63, and the fourth battery cell 64, when the sum of a discharge capacity corresponding to the first discharge voltage plateau and a discharge capacity corresponding to the second discharge voltage plateau is 100%, a percentage of the discharge capacity corresponding to the second discharge voltage plateau of the fourth battery cell 64>a percentage of the discharge capacity corresponding to the second discharge voltage plateau of the third battery cell 63>a percentage of the discharge capacity corresponding to the second discharge voltage plateau of the second battery cell 62>a percentage of the discharge capacity corresponding to the second discharge voltage plateau of the first battery cell 61. When the battery pack 1 is placed in an external environment with the same temperature, a temperature of the fourth area R4 is lower than a temperature of the third area R3, the temperature of the third area R3 is lower than a temperature of the second area R2, and the temperature of the second area R2 is lower than a temperature of the first area R1. The "rectangular shape" is not limited to a strictly rectangular shape, as long as it is a substantially rectangular shape, and "being in contact with an inner surface of the battery pack case" includes a case of "being in contact with a structural member provided on the inner surface of the battery pack case".

It should be noted that the "discharge voltage plateau" is a part of a discharge curve where a discharge voltage is relatively stable. During discharge in the discharge voltage plateau, a discharge capacity per unit time is relatively large.

Figure 3:
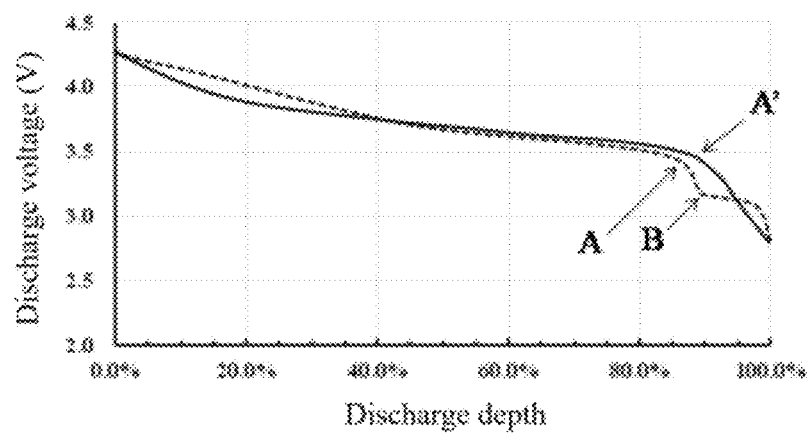
FIG. 3 is a graph showing constant-current discharge curves of battery cells each having a first discharge voltage plateau and a second discharge voltage plateau in a battery pack according to an implementation of the present application.

FIG. 3 is a graph showing constant-current discharge curves of two battery cells. The discharge curve shown by the solid line represents only one discharge voltage plateau, and a discharge voltage drops sharply after point A' (corresponding to a case where a battery cell has a single plateau); and the discharge curve shown by the dashed line represents two discharge voltage plateaus, a discharge voltage drops sharply after point A until point B and then becomes stable after point B, and the discharge continues to be performed by further utilizing the other discharge voltage plateau (corresponding to a case where a battery cell has two plateaus).

As shown by the dashed line in FIG. 3, the period before point B where a first voltage drop ends is the first discharge voltage plateau (namely, a high-voltage discharge plateau, that is, the first discharge voltage plateau of the present application), a value of the first discharge voltage plateau is equal to a ratio of all the energy released by a high-voltage positive electrode active material to a current (it is an equilibrium value, and may also be roughly regarded as an average voltage in the period before point B), the period after point B where the first voltage drop ends is the second discharge voltage plateau (namely, a low-voltage discharge plateau, that is, the second discharge voltage plateau of the present application), and the second discharge voltage plateau is embodied in a ratio of all the energy released by a low-voltage positive electrode active material to the current (it is an equilibrium value, and may also be roughly regarded as an average voltage in the period after point B).

In the present application, the battery cells 61, 62, 63, and 64 with different low-temperature energy retention rates and each having two discharge voltage plateaus (the first discharge voltage plateau with a higher discharge voltage and the second discharge voltage plateau with a lower discharge voltage) are respectively provided in the areas with different temperatures in the inner space of the battery pack case, and the battery cells with higher low-temperature energy retention rates are respectively provided in the areas with lower temperatures. Specifically, according to general temperature distribution inside the battery pack, a temperature of the first area R1>a temperature of the second area R2>a temperature of the third area R3>a temperature of the fourth area R4. In the present application, a percentage of the discharge capacity corresponding to the second discharge voltage plateau of the fourth battery cell 64>a percentage of the discharge capacity corresponding to the second discharge voltage plateau of the third battery cell 63>a percentage of the discharge capacity corresponding to the second discharge voltage plateau of the second battery cell 62>a percentage of the discharge capacity corresponding to the second discharge voltage plateau of the first battery cell 61.

It should be noted that, for a specific definition and a test method of the discharge capacity percentage corresponding to the second discharge voltage plateau of the first/second/third/fourth battery cell of the present application, refer to the section "Related tests" of the specification.

The battery cells at different positions inside the battery pack have different heat dissipation capabilities. Generally, battery cells closer to the outer side inside the battery pack have greater heat dissipation capabilities, that is, higher heat dissipation speeds. In a direction from the outer side inside the battery pack to the inner part inside the battery pack, heat dissipation speeds of the battery cells gradually decrease. On the contrary, in a direction from the inner part inside the battery pack to the outer side inside the battery pack, thermal insulation capabilities of the battery cells gradually decrease. Temperatures of the battery cells in different areas inside the battery pack are different, resulting in charge and discharge performance of the battery cells being inconsistent. For example, in an external low-temperature environment, the battery cells on the inner side inside the battery pack have lower heat dissipation speeds, higher temperatures, and better performance in the external low-temperature environment (but have poorer high-temperature performance). However, the battery cells on the outer side inside the battery pack have higher heat dissipation speeds, lower temperatures, and poorer performance in the external low-temperature environment (but have higher high-temperature performance). Therefore, an excessively large difference in charge and discharge performance of the battery cells in different areas inside the battery pack in a low-temperature environment leads to a decrease in an overall energy retention rate of the battery pack in a low-temperature environment.

In order to solve the above problems, the inventors of the present application have provided the first battery cell 61, the second battery cell 62, the third battery cell 63, and the fourth battery cell 64 each having two discharge voltage plateaus (that is, the first discharge voltage plateau with a higher discharge voltage and the second discharge voltage plateau with a lower discharge voltage) respectively in the first area R1, the second area R2, the third area R3, and the fourth area R4 with different temperatures, after discharge performed in the first discharge voltage plateaus ends, the discharge continues to be performed by further utilizing the second discharge voltage plateau (that is, stepwise discharge of the same battery cell is implemented), thereby increasing energy released by each battery cell in a low-temperature environment, and increasing an overall low-temperature energy retention rate of the battery pack.

Furthermore, it is found that by further adjusting the percentages of the discharge capacity corresponding to the second discharge voltage plateaus of the first battery cell 61, the second battery cell 62, the third battery cell 63, and the fourth battery cell 64, the battery pack 1 with a higher overall low-temperature energy retention rate can be obtained, and such a setting significantly increases the low-temperature energy retention rate of the battery pack in low temperature conditions in winter. Specifically, by making the percentage of the discharge capacity corresponding to the second discharge voltage plateau of the fourth battery cell cell 64>the percentage of the discharge capacity corresponding to the second discharge voltage plateau of the third battery cell 63>the percentage of the discharge capacity corresponding to the second discharge voltage plateau of the second battery cell 62>the percentage of the discharge capacity corresponding to the second discharge voltage plateau of the first battery cell 61, the second battery cell 62, the third battery cell 63, and the fourth battery cell 64 can continue to discharge in a low-temperature environment where the first battery cell 61 cannot continue discharging, the third battery cell 63 and the fourth battery cell 64 can continue to discharge in a low-temperature environment where the first battery cell 61 and the second battery cell 62 cannot continue discharging, and the fourth battery cell 64 can continue to discharge in a low-temperature environment where the first battery cell 61, the second battery cell 62, and the third battery cell 63 cannot continue discharging, thereby ensuring that the overall discharge capacity of the battery pack is at a high level.

The inventors further conducted in-depth studies on a relationship between the percentage of the discharge capacity corresponding to the second discharge voltage plateau of each of the battery cells 61, 62, 63, and 64 and the total energy retention rate of the battery pack at −20° C., where the battery cells each have two discharge voltage plateaus and are respectively provided in the areas R1, R2, R3, and R4 with different temperatures. The result shows that, in each of the first battery cell 61, the second battery cell 62, the third battery cell 63, and the fourth battery cell 64, when the sum of the discharge capacity corresponding to the first discharge voltage plateau and the discharge capacity corresponding to the second discharge voltage plateau is 100%, by making the percentage of the discharge capacity corresponding to the second discharge voltage plateau of the fourth battery cell 64>the percentage of the discharge capacity corresponding to the second discharge voltage plateau of the third battery cell 63>the percentage of the discharge capacity corresponding to the second discharge voltage plateau of the second battery cell 62>the percentage of the discharge capacity corresponding to the second discharge voltage plateau of the first battery cell 61, a low-temperature energy retention rate of the fourth battery cell 64>a low-temperature energy retention rate of the third battery cell 63>a low-temperature energy retention rate of the second battery cell 62>a low-temperature energy retention rate of the first battery cell 61, and energy (discharge capacity at a low temperature) released at a low temperature by the battery cells 61, 62, 63, and 64 respectively provided in the areas R1, R2, R3, and R4 with different temperatures inside the battery pack can be approximately the same, thereby increasing the overall low-temperature energy retention rate of the battery pack 1 (the total energy retention rate of the battery pack at −20° C.), and improving the overall low-temperature endurance of the battery pack.

In some implementations, in each of the first battery cell 61, the second battery cell 62, the third battery cell 63, and the fourth battery cell 64, a difference between a minimum discharge voltage in the first discharge voltage plateau and a maximum discharge voltage in the second discharge voltage plateau ranges from 0.25 V to 0.6 V.

Referring to FIG. 3, the "minimum discharge voltage in the first discharge voltage plateau" described in the present application is the discharge voltage corresponding to point A, and the "maximum discharge voltage in the second discharge voltage plateau" is the discharge voltage corresponding to point B.

Therefore, for a battery cell having two discharge voltage plateaus, if a difference between a minimum discharge voltage in the first discharge voltage plateau and a maximum discharge voltage in the second discharge voltage plateau is less than 0.25 V, it indicates that the mass of a positive electrode active material contributing to the second discharge voltage plateau is too large, and energy output by the positive electrode active material contributing to the second discharge voltage plateau is less than energy output by a positive electrode active material contributing to the first discharge voltage plateau, which results in low overall energy output of the battery cell, consequently resulting in low overall energy output of the battery pack. On the contrary, if the difference between the minimum discharge voltage in the first discharge voltage plateau and the maximum discharge voltage in the second discharge voltage plateau is greater than 0.6 V, it indicates that the mass of the positive electrode active material contributing to the first discharge voltage plateau is too large (the mass of the positive electrode active material contributing to the second discharge voltage plateau is too small), and in an external environment with a relatively low temperature, energy stops being output too early in the first discharge voltage plateau while energy output in the second discharge voltage plateau is limited, resulting in a low overall low-temperature energy retention rate of the battery pack.

In some implementations, in the first battery cell 61, when the sum of the discharge capacity corresponding to the first discharge voltage plateau and the discharge capacity corresponding to the second discharge voltage plateau is 100%, the discharge capacity corresponding to the first discharge voltage plateau accounts for 91.8% to 99%, and the discharge capacity corresponding to the second discharge voltage plateau accounts for 1% to 8.2%.

Therefore, by making the percentages of the discharge capacity corresponding to the first discharge voltage plateau and the discharge capacity corresponding to the second discharge voltage plateau of the first battery cell 61 be respectively within the above ranges, energy that the first battery cell 61 can release at a low temperature can be increased, thereby increasing the overall low-temperature energy retention rate of the battery pack 1.

In some implementations, in the second battery cell 62, when the sum of the discharge capacity corresponding to the first discharge voltage plateau and the discharge capacity corresponding to the second discharge voltage plateau is 100%, the discharge capacity corresponding to the first discharge voltage plateau accounts for 75.7% to 96.8%, and the discharge capacity corresponding to the second discharge voltage plateau accounts for 3.2% to 24.3%.

Therefore, by making the percentages of the discharge capacity corresponding to the first discharge voltage plateau and the discharge capacity corresponding to the second discharge voltage plateau of the second battery cell 62 be respectively within the above ranges, energy that the second battery cell 62 can release at a low temperature can be increased, thereby further increasing the overall low-temperature energy retention rate of the battery pack 1.

In some implementations, in the third battery cell 63, when the sum of the discharge capacity corresponding to the first discharge voltage plateau and the discharge capacity corresponding to the second discharge voltage plateau is 100%, the discharge capacity corresponding to the first discharge voltage plateau accounts for 60.2% to 89.4%, and the discharge capacity corresponding to the second discharge voltage plateau accounts for 10.6% to 39.8%.

Therefore, by making the percentages of the discharge capacity corresponding to the first discharge voltage plateau and the discharge capacity corresponding to the second discharge voltage plateau of the third battery cell 63 be respectively within the above ranges, energy that the third battery cell 63 can release at a low temperature can be increased, thereby further increasing the overall low-temperature energy retention rate of the battery pack 1.

In some implementations, in the fourth battery cell 64, when the sum of the discharge capacity corresponding to the first discharge voltage plateau and the discharge capacity corresponding to the second discharge voltage plateau is 100%, the discharge capacity corresponding to the first discharge voltage plateau accounts for 52.5% to 80.3%, and the discharge capacity corresponding to the second discharge voltage plateau accounts for 19.7% to 47.5%.

Therefore, by making the percentages of the discharge capacity corresponding to the first discharge voltage plateau and the discharge capacity corresponding to the second discharge voltage plateau of the fourth battery cell 64 be respectively within the above ranges, energy that the fourth battery cell 64 can release at a low temperature can be increased, thereby further increasing the overall low-temperature energy retention rate of the battery pack 1.

In some implementations, a positive electrode active material of each of the first battery cell 61, the second battery cell 62, the third battery cell 63, and the fourth battery cell 64 is formed by mixing a first positive electrode active material with the first discharge voltage plateau and a second positive electrode active material with the second discharge voltage plateau.

Therefore, the first battery cell 61, the second battery cell 62, the third battery cell 63, and the fourth battery cell 64 each have the first discharge voltage plateau and the second discharge voltage plateau with different discharge voltages, and after discharge is performed by utilizing the first discharge voltage plateau with a higher discharge voltage, the discharge continues to be performed by further utilizing the second discharge voltage plateau with a lower discharge voltage, thereby increasing a low-temperature energy retention rate of each of the first battery cell 61, the second battery cell 62, the third battery cell 63, and the fourth battery cell 64.

In some implementations, each of the first positive electrode active material and the second positive electrode active material is selected from at least one of: lithium nickelate, lithium cobalt oxide, lithium nickel manganese cobalt oxide, lithium nickel cobalt aluminium oxide, lithium iron phosphate, lithium manganese oxide, lithium titanate, and manganese dioxide.

Therefore, the first positive electrode active material and the second positive electrode active material may be selected from various existing positive electrode active materials, as long as the discharge voltages in and the discharge capacity percentages of the first discharge voltage plateau generated by the first positive electrode active material and the second discharge voltage plateau generated by the second positive electrode active material respectively meet the above relationships, so that the battery pack of the present application can be easily implemented by utilizing the existing positive electrode active materials.

In some implementations, the first positive electrode active material is lithium nickel manganese cobalt oxide, and the second positive electrode active material is lithium iron phosphate; or the first positive electrode active material is lithium nickel manganese cobalt oxide, and the second positive electrode active material is lithium manganese oxide or lithium titanate; or the first positive electrode active material is lithium iron phosphate, and the second positive electrode active material is lithium manganese oxide or lithium titanate.

The size order of voltage plateaus and specific energy is basically as follows: lithium nickel manganese cobalt oxide>lithium iron phosphate>lithium manganese oxide or lithium titanate. Therefore, relatively speaking, the value order of energy densities is as follows: lithium nickel manganese cobalt oxide+lithium iron phosphate>lithium nickel manganese cobalt oxide+lithium manganese oxide or lithium titanate>lithium iron phosphate+lithium manganese oxide or lithium titanate. Correspondingly, in a module or battery pack of the same volume, the order of endurance mileages of the above three systems is as follows: lithium nickel manganese cobalt oxide+lithium iron phosphate>lithium nickel manganese cobalt oxide+lithium manganese oxide or lithium titanate>lithium iron phosphate+lithium manganese oxide or lithium titanate. Therefore, lithium nickel manganese cobalt oxide+lithium iron phosphate is more applicable to scenarios requiring relatively high endurance mileages or relatively large output power; lithium nickel manganese cobalt oxide+lithium manganese oxide or lithium titanate is applicable to scenarios requiring moderate endurance mileages or moderate output power; and the system of lithium iron phosphate+lithium manganese oxide or lithium titanate is more applicable to low-speed mobility scooters and other scenarios with low output power requirements.

In some implementations, when the first positive electrode active materials and the second positive electrode active materials in the first battery cell 61, the second battery cell 62, the third battery cell 63, and the fourth battery cell 64 are both of the same type, respective mass percentages of the first positive electrode active materials in the positive electrode active materials of the first battery cell 61, the second battery cell 62, the third battery cell 63, and the fourth battery cell 64 decrease successively, and respective mass percentages of the second positive electrode active materials in the positive electrode active materials of the first battery cell 61, the second battery cell 62, the third battery cell 63, and the fourth battery cell 64 increase successively.

The larger the mass percentage of the second positive electrode active material used to generate the second discharge voltage plateau with a lower discharge voltage, the greater the percentage of the discharge capacity corresponding to the second discharge voltage plateau, and the higher the low-temperature energy retention rate of the battery cell. By making the mass percentage of the second positive electrode active material of the fourth battery cell 64 provided in the fourth area R4>the mass percentage of the second positive electrode active material of the third battery cell 63 provided in the third area R3>the mass percentage of the second positive electrode active material of the second battery cell 62 provided in the second area R2>the mass percentage of the second positive electrode active material of the first battery cell 61 provided in the first area R1, the low-temperature energy retention rate of the fourth battery cell 64>the low-temperature energy retention rate of the third battery cell 63>the low-temperature energy retention rate of the second battery cell 62>the low-temperature energy retention rate of the first battery cell 61, and energy released at a low temperature by the first battery cell 61, the second battery cell 62, the third battery cell 63, and the fourth battery cell 64 can be approximately the same, thereby increasing the overall low-temperature energy retention rate of the battery pack 1.

In some implementations, in the first battery cell 61, when the total mass of the first positive electrode active material and the second positive electrode active material is 100%, the mass of the first positive electrode active material accounts for 92.5% to 97.5%, and the mass of the second positive electrode active material accounts for 2.5% to 7.5%.

Therefore, by making the mass percentages of the first positive electrode active material and the second positive electrode active material in the first battery cell 61 be respectively within the above ranges, the percentages of the discharge capacity corresponding to the first discharge voltage plateau and the discharge capacity corresponding to the second discharge voltage plateau of the first battery cell 61 can be respectively within the above ranges, and energy that the first battery cell 61 can release at a low temperature can be increased, thereby increasing the overall low-temperature energy retention rate of the battery pack 1.

In some implementations, in the second battery cell 62, when the total mass of the first positive electrode active material and the second positive electrode active material is 100%, the mass of the first positive electrode active material accounts for 77.5% to 92.5%, and the mass of the second positive electrode active material accounts for 7.5% to 22.5%.

Therefore, by making the mass percentages of the first positive electrode active material and the second positive electrode active material in the second battery cell 62 be respectively within the above ranges, the percentages of the discharge capacity corresponding to the first discharge voltage plateau and the discharge capacity corresponding to the second discharge voltage plateau of the second battery cell 62 can be respectively within the above ranges, and energy that the second battery cell 62 can release at a low temperature can be increased, thereby further increasing the overall low-temperature energy retention rate of the battery pack 1.

In some implementations, in the third battery cell 63, when the total mass of the first positive electrode active material and the second positive electrode active material is 100%, the mass of the first positive electrode active material accounts for 62.5% to 77.5%, and the mass of the second positive electrode active material accounts for 22.5% to 37.5%.

Therefore, by making the mass percentages of the first positive electrode active material and the second positive electrode active material in the third battery cell 63 be respectively within the above ranges, the percentages of the discharge capacity corresponding to the first discharge voltage plateau and the discharge capacity corresponding to the second discharge voltage plateau of the third battery cell 63 can be respectively within the above ranges, and energy that the third battery cell 63 can release at a low temperature can be increased, thereby further increasing the overall low-temperature energy retention rate of the battery pack 1.

In some implementations, in the fourth battery cell 64, when the total mass of the first positive electrode active material and the second positive electrode active material is 100%, the mass of the first positive electrode active material accounts for 50% to 62.5%, and the mass of the second positive electrode active material accounts for 37.5% to 50%.

Therefore, by making the mass percentages of the first positive electrode active material and the second positive electrode active material in the fourth battery cell 64 be respectively within the above ranges, the percentages of the discharge capacity corresponding to the first discharge voltage plateau and the discharge capacity corresponding to the second discharge voltage plateau of the fourth battery cell 64 can be respectively within the above ranges, and energy that the fourth battery cell 64 can release at a low temperature can be increased, thereby further increasing the overall low-temperature energy retention rate of the battery pack 1.

In some implementations, when the first positive electrode active material is lithium nickel manganese cobalt oxide, and the second positive electrode active material is lithium iron phosphate, a mass ratio of the second positive electrode active material in the first battery cell 61 to that in the second battery cell 62, that in the third battery cell 63, and that in the fourth battery cell 64 is 1:(1-3):(3-5):(5-9); when the first positive electrode active material is lithium nickel manganese cobalt oxide, and the second positive electrode active material is lithium titanate or lithium manganese oxide, a mass ratio of the second positive electrode active material in the first battery cell 61 to that in the second battery cell 62, that in the third battery cell 63, and that in the fourth battery cell 64 is 1:(1-2):(3-4):(5-7); and when the first positive electrode active material is lithium iron phosphate, and the second positive electrode active material is lithium titanate or lithium manganese oxide, a mass ratio of the second positive electrode active material in the first battery cell 61 to that in the second battery cell 62, that in the third battery cell 63, and that in the fourth battery cell 64 is 1:(1-3):(3-5):(5-9).

Therefore, by using the specific first positive electrode active material and the specific second positive electrode active material in a specific mass ratio in each of the first battery cell 61, the second battery cell 62, the third battery cell 63, and the fourth battery cell 64, the battery pack of the present application applicable to different scenarios can be easily implemented.

In some implementations, at a temperature below 0° C., a discharge cut-off voltage of the first battery cell 61 is higher than a discharge cut-off voltage of the second battery cell 62 by 0 V to 0.3 V, the discharge cut-off voltage of the second battery cell 62 is higher than a discharge cut-off voltage of the third battery cell 63 by 0 V to 0.3 V, the discharge cut-off voltage of the third battery cell 63 is higher than a discharge cut-off voltage of the fourth battery cell 64 by 0 V to 0.3 V, and the discharge cut-off voltage of the fourth battery cell 64 is 1.6 V or more.

Therefore, by setting the discharge cut-off voltages of the first battery cell 61, the second battery cell 62, the third battery cell 63, and the fourth battery cell 64 as described above, energy released at a low temperature by the first battery cell 61, the second battery cell 62, the third battery cell 63, and the fourth battery cell 64 can be approximately the same, so that the overall low-temperature energy retention rate of the battery pack can be increased.

In either cases of an excessively high charge cut-off voltage or an excessively low discharge cut-off voltage, the cycling performance of the battery cell may be damaged. In the case of the excessively high charge cut-off voltage, the battery cells may be overcharged. When the fully charged battery cells continue being charged, structures of positive electrode materials may be changed, resulting in a capacity loss, and oxygen released by decomposition of the positive electrode materials may be subjected to a violent chemical reaction with an electrolyte, which may cause an explosion in the worst case. In the case of the excessively low discharge cut-off voltage, the battery cells may be over-discharged. As a result, an internal pressure of the battery cells may be increased, the reversibility of the positive and negative electrode active materials may be destroyed, and only part of the battery cells may be recovered even when they are charged, and the capacity may also be obviously reduced. Deep charging and deep discharging of battery cells may increase losses of the battery cells. The most ideal working state of battery cells is shallow charging and shallow discharging, which can prolong service life of the battery cells.

In some implementations, a ratio of the number of first battery cells 61 to that of second battery cells 62, that of third battery cells 63, and that of fourth battery cells 64 is (3-8):(8-13):(9-14): 1. In other words, when the sum of the number of first battery cells 61, the number of second battery cells 62, the number of third battery cells 63, and the number of fourth battery cells 64 is 100%, the number of first battery cells 61 accounts for 10% to 30%, the number of second battery cells 62 accounts for 25% to 50%, the number of third battery cells 63 accounts for 30% to 55%, and the number of fourth battery cells 64 accounts for 2% to 5%.

In some implementations, the number of first battery cells may be 1.

Therefore, the battery pack of the present application can be easily implemented as long as the numbers of first battery cells 61, second battery cells 62, third battery cells 63, and fourth battery cells 64 are set based on a common temperature distribution range of the battery pack.

In some implementations, capacitors (for example, capacitors C11 and C12 in FIG. 2) are disposed in a gap between different battery cells.

Therefore, the gap between the battery cells can be fully utilized to increase the overall volume energy density of the battery pack.

Power Consuming Device

In addition, the present application further provides a power consuming device including the battery pack of the present application. The battery pack may be used as a power source of the power consuming device, or may be used as an energy storage unit of the power consuming device. The power consuming device may include a mobile device (for example, a mobile phone or a laptop computer), an electric vehicle (for example, a battery electric vehicle, a hybrid electric vehicle, a plug-in hybrid electric vehicle, an electric bicycle, an electric scooter, an electric golf cart, or an electric truck), an electric train, ship, and satellite, and an energy storage system, but is not limited thereto.

The battery cell or battery pack may be selected according to usage requirements of the power consuming device.

Figure 4:
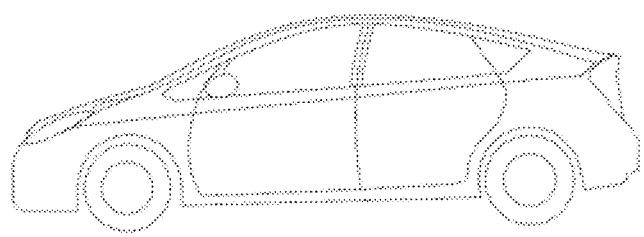
FIG. 4 is a schematic diagram of a power consuming device using a battery pack according to an implementation of the present application as a power source.

FIG. 4 shows an example of the power consuming device. The power consuming device may be a battery electric vehicle, a hybrid electric vehicle, a plug-in hybrid electric vehicle, or the like. In order to meet requirements of the power consuming device for low-temperature endurance, the battery pack of the present application may be used.

EMBODIMENTS

The embodiments of the present application are described below. The embodiments described below are exemplary and are merely used to explain the present application, and should not be construed as limiting the present application. The technologies or conditions that are not specified in the embodiments are according to the technologies or conditions described in documents in the art or the product introduction. The used reagents or instruments not marked with the manufacturer are common products that are commercially available.

(1) Preparation of Battery Cells

I. Preparation of First Battery Cells

Preparation Example I-1

1) Preparation of a Positive Electrode Plate

A first positive electrode active material $LiNi_{0.6}Co_{0.2}Mn_{0.2}O_2$ (NCM) and a second positive electrode active material lithium iron phosphate (LFP) that are used as a positive electrode active material, super-conductive carbon black SP used as a conductive agent, and polyvinylidene fluoride (PVDF) used as a binder are dispersed in N-methylpyrrolidone (NMP) used as a solvent and mixed uniformly to obtain a positive electrode slurry; and after being coated with the positive electrode slurry, positive electrode current collector aluminum foil is then dried, cold pressed, slit, and cut to obtain the positive electrode plate, where a mass ratio of the positive electrode active material to super-conductive carbon black to the binder PVDF is 96:2:2, and a mass ratio of the second positive electrode active material LFP to the first positive electrode active material NCM is 5:95.

2) Preparation of a Negative Electrode Plate

A negative electrode active material graphite, super-conductive carbon black SP used as a conductive agent, SBR used as a binder, and CMC-Na used as a thickener are dispersed in deionized water used as a solvent in a mass ratio of 96:1:1:2 and mixed uniformly to obtain a negative electrode slurry; and after being coated with the negative electrode slurry, negative electrode current collector copper foil is then dried, cold pressed, slit, and cut to obtain the negative electrode plate.

3) Separator

A polyethylene film is selected as the separator.

4) Preparation of an Electrolyte

Ethylene carbonate (EC), dimethyl carbonate (DMC), and diethyl carbonate (DEC) are mixed uniformly in a volume ratio of 1:1:1 to obtain an organic solvent, and then fully dried lithium salt $LiPF_6$ is dissolved in the mixed organic solvent, to obtain an electrolyte with a concentration of 1 mol/L.

5) Preparation of the Battery Cell

The above positive electrode plate, separator, and negative electrode plate are stacked in sequence, such that the separator is located between the positive electrode plate and the negative electrode plate to play a role of isolation, and are then wound to obtain a bare cell; and the bare cell is placed in an outer packaging case, dried, and injected with the electrolyte, and is then subjected to procedures such as vacuum packaging, standing, forming, and shaping, to obtain the first battery cell I-1.

Preparation Example I-2

A first battery cell I-2 is obtained in the same operations as in Preparation example I-1, except that the first positive electrode active material $LiNi_{0.6}Co_{0.2}Mn_{0.2}O_2$ (NCM) and the second positive electrode active material lithium manganese oxide (LMO) are used as the positive electrode active material.

Preparation Example I-3

A first battery cell I-3 is obtained in the same operations as in Preparation example I-1, except that the first positive electrode active material $LiNi_{0.6}Co_{0.2}Mn_{0.2}O_2$ (NCM) and the second positive electrode active material lithium titanate (LTO) are used as the positive electrode active material.

Preparation Example I-4

A first battery cell I-4 is obtained in the same operations as in Preparation example I-1, except that the first positive electrode active material lithium iron phosphate (LFP) and the second positive electrode active material lithium manganese oxide (LMO) are used as the positive electrode active material.

Preparation Example I-5

A first battery cell I-5 is obtained in the same operations as in Preparation example I-1, except that the first positive electrode active material lithium iron phosphate (LFP) and the second positive electrode active material lithium titanate (LTO) are used as the positive electrode active material.

Preparation Example I-6

A first battery cell I-6 is obtained in the same operations as in Preparation example I-1, except that a mass ratio of the second positive electrode active material LFP to the first positive electrode active material NCM is 2.5:97.5.

Preparation Example I-7

A first battery cell I-7 is obtained in the same operations as in Preparation example 1-2, except that a mass ratio of the second positive electrode active material LMO to the first positive electrode active material NCM is 2.5:97.5.

Preparation Example I-8

A first battery cell I-8 is obtained in the same operations as in Preparation example 1-3, except that a mass ratio of the second positive electrode active material LTO to the first positive electrode active material NCM is 2.5:97.5.

Preparation Example I-9

A first battery cell I-9 is obtained in the same operations as in Preparation example 1-4, except that a mass ratio of the second positive electrode active material LMO to the first positive electrode active material LFP is 2.5:97.5.

Preparation Example I-10

A first battery cell I-10 is obtained in the same operations as in Preparation example 1-5, except that a mass ratio of the second positive electrode active material LTO to the first positive electrode active material LFP is 2.5:97.5.

Preparation Example I-11

A first battery cell I-11 is obtained in the same operations as in Preparation example 1-5, except that a mass ratio of the second positive electrode active material LTO to the first positive electrode active material LFP is 7.5:92.5.

Preparation Example I-12

A first battery cell I-12 is obtained in the same operations as in Preparation example I-1, except that only NCM is used as the positive electrode active material.

Preparation Example I-13

A first battery cell I-13 is obtained in the same operations as in Preparation example I-1, except that a mass ratio of the second positive electrode active material LFP to the first positive electrode active material NCM is 37.5:62.5.

Preparation Example I-14

A first battery cell I-14 is obtained in the same operations as in Preparation example 1-3, except that a mass ratio of the second positive electrode active material LTO to the first positive electrode active material NCM is 55:45.

Preparation Example I-15

A first battery cell I-15 is obtained in the same operations as in Preparation example 1-3, except that a mass ratio of the second positive electrode active material LTO to the first positive electrode active material NCM is 0.5:99.5.

Preparation Example I-16

A first battery cell I-16 is obtained in the same operations as in Preparation example 1-5, except that the second positive electrode active material LTO to the first positive electrode active material LFP is 22.5:77.5.

II. Preparation of Second Battery Cells

Preparation Example II-1

A second battery cell II-1 is obtained in the same operations as in Preparation example I-1, except that a mass ratio of the second positive electrode active material LFP to the first positive electrode active material NCM is 12.5:87.5.

Preparation Example II-2

A second battery cell II-2 is obtained in the same operations as in Preparation example 1-2, except that a mass ratio of the second positive electrode active material LMO to the first positive electrode active material NCM is 12.5:87.5.

Preparation Example II-3

A second battery cell II-3 is obtained in the same operations as in Preparation example 1-3, except that a mass ratio of the second positive electrode active material LTO to the first positive electrode active material NCM is 12.5:87.5.

Preparation Example II-4

A second battery cell II-4 is obtained in the same operations as in Preparation example 1-4, except that a mass ratio of the second positive electrode active material LMO to the first positive electrode active material LFP is 12.5:87.5.

Preparation Example II-5

A second battery cell II-5 is obtained in the same operations as in Preparation example 1-5, except that a mass ratio of the second positive electrode active material LTO to the first positive electrode active material LFP is 12.5:87.5.

Preparation Example II-6

A second battery cell II-6 is obtained in the same operations as in Preparation example 1-2, except that a mass ratio of the second positive electrode active material LMO to the first positive electrode active material NCM is 7.5:92.5.

Preparation Example II-7

A second battery cell II-7 is obtained in the same operations as in Preparation example 1-5, except that a mass ratio of the second positive electrode active material LTO to the first positive electrode active material LFP is 22.5:77.5.

Preparation Example II-8

A second battery cell II-8 is obtained in the same operations as in Preparation example I-1, except that only LFP is used as the positive electrode active material.

Preparation Example II-9

A second battery cell II-9 is obtained in the same operations as in Preparation example I-1, except that only NCM is used as the positive electrode active material.

Preparation Example II-10

A second battery cell II-10 is obtained in the same operations as in Preparation example I-1, except that a mass ratio of the second positive electrode active material LFP to the first positive electrode active material NCM is 22.5:77.5.

Preparation Example II-11

A second battery cell II-11 is obtained in the same operations as in Preparation example 1-3, except that a mass ratio of the second positive electrode active material LTO to the first positive electrode active material NCM is 65:35.

Preparation Example II-12

A second battery cell II-12 is obtained in the same operations as in Preparation example 1-3, except that a mass ratio of the second positive electrode active material LTO to the first positive electrode active material NCM is 1:99.

Preparation Example II-13

A second battery cell II-13 is obtained in the same operations as in Preparation example 1-5, except that a mass ratio of the second positive electrode active material LTO to the first positive electrode active material LFP is 60:40.

III. Preparation of Third Battery Cells

Preparation Example III-1

A third battery cell III-1 is obtained in the same operations as in Preparation example I-1, except that a mass ratio of the second positive electrode active material LFP to the first positive electrode active material NCM is 22.5:77.5.

Preparation Example III-2

A third battery cell III-2 is obtained in the same operations as in Preparation example 1-2, except that a mass ratio of the second positive electrode active material LMO to the first positive electrode active material NCM is 22.5:77.5.

Preparation Example III-3

A third battery cell III-3 is obtained in the same operations as in Preparation example 1-3, except that a mass ratio of the second positive electrode active material LTO to the first positive electrode active material NCM is 22.5:77.5.

Preparation Example III-4

A third battery cell III-4 is obtained in the same operations as in Preparation example 1-4, except that a mass ratio of the second positive electrode active material LMO to the first positive electrode active material LFP is 22.5:77.5.

Preparation Example III-5

A third battery cell III-5 is obtained in the same operations as in Preparation example 1-5, except that a mass ratio of the second positive electrode active material LTO to the first positive electrode active material LFP is 22.5:77.5.

Preparation Example III-6

A third battery cell III-6 is obtained in the same operations as in Preparation example 1-5, except that a mass ratio of the second positive electrode active material LTO to the first positive electrode active material LFP is 37.5:62.5.

Preparation Example III-7

A third battery cell III-7 is obtained in the same operations as in Preparation example I-1, except that only LMO is used as the positive electrode active material.

Preparation Example III-8

A third battery cell III-8 is obtained in the same operations as in Preparation example I-1, except that only NCM is used as the positive electrode active material.

Preparation Example III-9

A third battery cell III-9 is obtained in the same operations as in Preparation example I-1, except that a mass ratio of the second positive electrode active material LFP to the first positive electrode active material NCM is 12.5:87.5.

Preparation Example III-10

A third battery cell III-10 is obtained in the same operations as in Preparation example 1-3, except that a mass ratio of the second positive electrode active material LTO to the first positive electrode active material NCM is 65:35.

Preparation Example III-11

A third battery cell III-11 is obtained in the same operations as in Preparation example 1-3, except that a mass ratio of the second positive electrode active material LTO to the first positive electrode active material NCM is 1.5:98.5.

Preparation Example III-12

A third battery cell III-12 is obtained in the same operations as in Preparation example 1-5, except that a mass ratio of the second positive electrode active material LTO to the first positive electrode active material LFP is 50:50.

IV. Preparation of Fourth Battery Cells

Preparation Example IV-1

A fourth battery cell IV-1 is obtained in the same operations as in Preparation example I-1, except that a mass ratio of the second positive electrode active material LFP to the first positive electrode active material NCM is 37.5:62.5.

Preparation Example IV-2

A fourth battery cell IV-2 is obtained in the same operations as in Preparation example 1-2, except that a mass ratio of the second positive electrode active material LMO to the first positive electrode active material NCM is 37.5:62.5.

Preparation Example IV-3

A fourth battery cell IV-3 is obtained in the same operations as in Preparation example 1-3, except that a mass ratio of the second positive electrode active material LTO to the first positive electrode active material NCM is 37.5:62.5.

Preparation Example IV-4

A fourth battery cell IV-4 is obtained in the same operations as in Preparation example 1-4, except that a mass ratio of the second positive electrode active material LMO to the first positive electrode active material LFP is 37.5:62.5.

Preparation Example IV-5

A fourth battery cell IV-5 is obtained in the same operations as in Preparation example 1-5, except that a mass ratio of the second positive electrode active material LTO to the first positive electrode active material LFP is 37.5:62.5.

Preparation Example IV-6

A fourth battery cell IV-6 is obtained in the same operations as in Preparation example I-1, except that a mass ratio of the second positive electrode active material LFP to the first positive electrode active material NCM is 50:50.

Preparation Example IV-7

A fourth battery cell IV-7 is obtained in the same operations as in Preparation example 1-2, except that a mass ratio of the second positive electrode active material LMO to the first positive electrode active material NCM is 50:50.

Preparation Example IV-8

A fourth battery cell IV-8 is obtained in the same operations as in Preparation example 1-3, except that a mass ratio of the second positive electrode active material LTO to the first positive electrode active material NCM is 50:50.

Preparation Example IV-9

A fourth battery cell IV-9 is obtained in the same operations as in Preparation example 1-4, except that a mass ratio of the second positive electrode active material LMO to the first positive electrode active material LFP is 50:50.

Preparation Example IV-10

A fourth battery cell IV-10 is obtained in the same operations as in Preparation example 1-5, except that a mass ratio of the second positive electrode active material LTO to the first positive electrode active material LFP is 50:50.

Preparation Example IV-11

A fourth battery cell IV-11 is obtained in the same operations as in Preparation example I-1, except that a mass ratio of the second positive electrode active material LFP to the first positive electrode active material NCM is 22.5:77.5.

Preparation Example IV-12

A fourth battery cell IV-12 is obtained in the same operations as in Preparation example I-1, except that only LTO is used as the positive electrode active material.

Preparation Example IV-13

A fourth battery cell IV-13 is obtained in the same operations as in Preparation example I-1, except that only NCM is used as the positive electrode active material.

Preparation Example IV-14

A fourth battery cell IV-14 is obtained in the same operations as in Preparation example I-1, except that a mass ratio of the second positive electrode active material LFP to the first positive electrode active material NCM is 5:95.

Preparation Example IV-15

A fourth battery cell IV-15 is obtained in the same operations as in Preparation example 1-3, except that a mass ratio of the second positive electrode active material LTO to the first positive electrode active material NCM is 65:35.

Preparation Example IV-16

A fourth battery cell IV-16 is obtained in the same operations as in Preparation example 1-3, except that a mass ratio of the second positive electrode active material LTO to the first positive electrode active material NCM is 2:98.

(2) Assembly of a Battery Pack

Embodiment 1

As shown in FIG. 2, an inner space of a battery pack case is divided into a first area R1, a second area R2, a third area R3, and a fourth area R4, the first battery cell I-1 is provided in the first area R1 as the first battery cell 61, the second battery cell II-1 is provided in the second area R2 as the second battery cell 62, the third battery cell III-1 is provided in the third area R3 as the third battery cell 63, and the fourth battery cell IV-1 is provided in the fourth area R4 as the fourth battery cell 64, to be assembled into the battery pack. A ratio of the number of first battery cells 61 to that of second battery cells 62, that of third battery cells 63, and that of fourth battery cells 64 is 12:32:36:4.

Embodiment 2

A battery pack is assembled in the same operations as in Embodiment 1, except that the first battery cell I-2 is used instead of the first battery cell I-1, the second battery cell II-2 is used instead of the second battery cell II-1, the third battery cell III-2 is used instead of the third battery cell III-1, and the fourth battery cell IV-2 is used instead of the fourth battery cell IV-1.

Embodiment 3

A battery pack is assembled in the same operations as in Embodiment 1, except that the first battery cell I-3 is used instead of the first battery cell I-1, the second battery cell II-3 is used instead of the second battery cell II-1, the third battery cell III-3 is used instead of the third battery cell III-1, and the fourth battery cell IV-3 is used instead of the fourth battery cell IV-1.

Embodiment 4

A battery pack is assembled in the same operations as in Embodiment 1, except that the first battery cell I-4 is used instead of the first battery cell I-1, the second battery cell II-4 is used instead of the second battery cell II-1, the third battery cell III-4 is used instead of the third battery cell III-1, and the fourth battery cell IV-4 is used instead of the fourth battery cell IV-1.

Embodiment 5

A battery pack is assembled in the same operations as in Embodiment 1, except that the first battery cell I-5 is used instead of the first battery cell I-1, the second battery cell II-5 is used instead of the second battery cell II-1, the third battery cell III-5 is used instead of the third battery cell III-1, and the fourth battery cell IV-5 is used instead of the fourth battery cell IV-1.

Embodiment 6

A battery pack is assembled in the same operations as in Embodiment 1, except that the first battery cell I-6 is used instead of the first battery cell I-1 and the fourth battery cell IV-6 is used instead of the fourth battery cell IV-1.

Embodiment 7

A battery pack is assembled in the same operations as in Embodiment 1, except that the first battery cell I-7 is used instead of the first battery cell I-1, the second battery cell II-2 is used instead of the second battery cell II-1, the third battery cell III-2 is used instead of the third battery cell III-1, and the fourth battery cell IV-7 is used instead of the fourth battery cell IV-1.

Embodiment 8

A battery pack is assembled in the same operations as in Embodiment 1, except that the first battery cell I-8 is used instead of the first battery cell I-1, the second battery cell II-3 is used instead of the second battery cell II-1, the third battery cell III-3 is used instead of the third battery cell III-1, and the fourth battery cell IV-8 is used instead of the fourth battery cell IV-1.

Embodiment 9

A battery pack is assembled in the same operations as in Embodiment 1, except that the first battery cell I-9 is used instead of the first battery cell I-1, the second battery cell II-4 is used instead of the second battery cell II-1, the third battery cell III-4 is used instead of the third battery cell III-1, and the fourth battery cell IV-9 is used instead of the fourth battery cell IV-1.

Embodiment 10

A battery pack is assembled in the same operations as in Embodiment 1, except that the first battery cell I-10 is used instead of the first battery cell I-1, the second battery cell II-5 is used instead of the second battery cell II-1, the third battery cell III-5 is used instead of the third battery cell III-1, and the fourth battery cell IV-10 is used instead of the fourth battery cell IV-1.

Embodiment 11

A battery pack is assembled in the same operations as in Embodiment 1, except that the first battery cell I-14 is used instead of the first battery cell I-1, the second battery cell II-11 is used instead of the second battery cell II-1, the third battery cell III-10 is used instead of the third battery cell III-1, and the fourth battery cell IV-15 is used instead of the fourth battery cell IV-1.

Embodiment 12

A battery pack is assembled in the same operations as in Embodiment 1, except that the first battery cell I-15 is used instead of the first battery cell I-1, the second battery cell II-12 is used instead of the second battery cell II-1, the third battery cell III-11 is used instead of the third battery cell III-1, and the fourth battery cell IV-16 is used instead of the fourth battery cell IV-1.

Embodiment 13

A battery pack is assembled in the same operations as in Embodiment 1, except that the first battery cell I-7 is used instead of the first battery cell I-1, the second battery cell II-6 is used instead of the second battery cell II-1, the third battery cell III-2 is used instead of the third battery cell III-1, and the fourth battery cell IV-2 is used instead of the fourth battery cell IV-1.

Embodiment 14

A battery pack is assembled in the same operations as in Embodiment 1, except that the first battery cell I-7 is used instead of the first battery cell I-1, the second battery cell II-6 is used instead of the second battery cell II-1, the third battery cell III-6 is used instead of the third battery cell III-1, and the fourth battery cell IV-10 is used instead of the fourth battery cell IV-1.

Embodiment 15

A battery pack is assembled in the same operations as in Embodiment 1, except that the first battery cell I-11 is used instead of the first battery cell I-1, the second battery cell II-7 is used instead of the second battery cell II-1, the third battery cell III-6 is used instead of the third battery cell III-1, and the fourth battery cell IV-10 is used instead of the fourth battery cell IV-1.

Embodiment 16

A battery pack is assembled in the same operations as in Embodiment 1, except that the first battery cell I-16 is used instead of the first battery cell I-1, the second battery cell II-13 is used instead of the second battery cell II-1, the third battery cell III-12 is used instead of the third battery cell III-1, and the fourth battery cell IV-10 is used instead of the fourth battery cell IV-1.

Embodiment 17

A battery pack is assembled in the same operations as in Embodiment 1.

Embodiment 18

A battery pack is assembled in the same operations as in Embodiment 1.

Embodiment 19

A battery pack is assembled in the same operations as in Embodiment 1.

Embodiment 20

A battery pack is assembled in the same operations as in Embodiment 1.

Embodiment 21

A battery pack is assembled in the same operations as in Embodiment 1.

Embodiment 22

A battery pack is assembled in the same operations as in Embodiment 1.

Embodiment 23

A battery pack is assembled in the same operations as in Embodiment 1.

Comparative Example 1

A battery pack is assembled in the same operations as in Embodiment 1, except that the first battery cell I-12 is used instead of the first battery cell I-1, the second battery cell II-8 is used instead of the second battery cell II-1, the third battery cell III-7 is used instead of the third battery cell III-1, and the fourth battery cell IV-12 is used instead of the fourth battery cell IV-1.

Comparative Example 2

A battery pack is assembled in the same operations as in Embodiment 1, except that the first battery cell I-12 is used instead of the first battery cell I-1, the second battery cell II-9 is used instead of the second battery cell II-1, the third battery cell III-8 is used instead of the third battery cell III-1, and the fourth battery cell IV-13 is used instead of the fourth battery cell IV-1.

Comparative Example 3

A battery pack is assembled in the same operations as in Embodiment 1, except that the first battery cell I-13 is used instead of the first battery cell I-1, the second battery cell II-10 is used instead of the second battery cell II-1, the third battery cell III-9 is used instead of the third battery cell III-1, and the fourth battery cell IV-14 is used instead of the fourth battery cell IV-1.

(3) Related Tests

1. Determination of a Discharge Capacity Corresponding to a First Discharge Voltage Plateau and a Discharge Capacity Corresponding to a Second Discharge Voltage Plateau of a Battery Cell For the first battery cell, the second battery cell, the third battery cell, and the fourth battery cell in each battery pack in Embodiments 1 to 23 and Comparative examples 1 to 3, a Neware power battery tester (Model BTS-5V300A-4CH) is used to measure discharge capacity corresponding to a first discharge voltage plateau and discharge capacity corresponding to a second discharge voltage plateau of each of the first battery cell, the second battery cell, the third battery cell, and the fourth battery cell at 25° C., to calculate a percentage (%) of the discharge capacity corresponding to the second discharge voltage plateau of each of the first battery cell, the second battery cell, the third battery cell, and the fourth battery cell.

A method for measuring a discharge capacity of a battery cell includes the following steps:

(1) Let the battery cell stand at 25° C. for 2 h to ensure that a temperature of the battery cell is 25° C.

(2) After charging the battery cell at 0.33 C at 25° C. to the charge cut-off voltage shown in Table 1 below, continue to perform constant voltage charging at the charge cut-off voltage until a current reaches 0.05 C, and at this time, the charging ends (where C represents rated capacity of the battery cell).

(3) Let the battery cell stand at 25° C. for 1 h.

(4) Discharge the battery cell at 0.33 C at 25° C. to the discharge cut-off voltage shown in Table 1 below, and record the total discharge capacity C0 of the battery cell.

(5) Obtain a discharge curve for step (4), for example, as shown by the discharge curve represented by the dashed line in FIG. 3 of the present application. In the discharge curve represented by the dashed line in FIG. 3, the total discharge capacity represented by the segment before point B is a discharge capacity C1 corresponding to a first discharge voltage plateau, and a discharge capacity represented by the segment from point B to the discharge cut-off voltage is a discharge capacity C2 corresponding to a second discharge voltage plateau.

Therefore, a percentage of the discharge capacity corresponding to the first discharge voltage plateau of the battery cell is equal to C1/C0, and a percentage of the discharge capacity corresponding to the second discharge voltage plateau of the battery cell is equal to C2/C0.

TABLE 1

| Types of Positive Electrode Active Materials | Charge Cut-Off Voltage (V) | Discharge Cut-Off Voltage (V) |
|---|---|---|
| NCM + LFP | 4.2 | 2.5 |
| NCM + LMO | 4.2 | 2 |
| NCM + LTO | 4.2 | 2 |
| LFP + LMO | 3.6 | 2 |
| LFP + LTO | 3.6 | 2 |

2. Determination of a Total Energy Retention Rate of a Battery Pack at −20° C.

In addition, for each battery pack in Embodiments 1 to 23 and Comparative examples 1 to 3, a Neware power battery tester (Model BTS-5V300A-4CH) is used to measure total full discharge energy of the battery pack at 25° C. and total full discharge energy of the battery pack at −20° C., and the total full discharge energy of the battery pack at −20° C. is divided by the total full discharge energy of the battery pack at 25° C. to calculate the total energy retention rate (%) of the battery pack at −20° C.

The measurement of the total full discharge energy of the battery pack at 25° C. is carried out in accordance with section "7.1.2 Capacity and energy test at room temperature" in "Lithium-ion Traction Battery Pack and System for Electric Vehicles-Part 2: Test Specification for High Energy Applications" in GB/T 31467.2-2015.

The measurement of the total full discharge energy of the battery pack at—20° C. is carried out in accordance with section "7.1.4 Capacity and energy test at low temperature" in "Lithium-ion Traction Battery Pack and System for Electric Vehicles-Part 2: Test Specification for High Energy Applications" in GB/T 31467.2-2015. Compositions and test results of the battery packs in Embodiments 1 to 23 and Comparative examples 1 to 3 are shown in Table 2 to Table 5 below.

TABLE 2

| | Battery Pack | | | | | | | |
|---|---|---|---|---|---|---|---|---|
| | First area First battery cell | | | | Second area Second battery cell | | | |
| | Types of Positive Electrode Active Materials | Mass ratio of the second positive electrode active material to the first positive electrode active material | Percentage A of the discharge capacity corresponding to the second discharge voltage plateau | Discharge cut-off voltage (V) at −20° C. | Types of Positive Electrode Active Materials | Mass ratio of the second positive electrode active material to the first positive electrode active material | Percentage B of the discharge capacity corresponding to the second discharge voltage plateau | Discharge cut-off voltage (V) at −20° C. |
| Embodiment 1 | NCM + LFP | 5:95 | 3.4% | 2.1 | NCM + LFP | 12.5:87.5 | 8.6% | 2 |
| Embodiment 2 | NCM + LMO | 5:95 | 2.1% | 2.1 | NCM + LMO | 12.5:87.5 | 5.5% | 2 |
| Embodiment 3 | NCM + LTO | 5:95 | 3.7% | 2.1 | NCM + LTO | 12.5:87.5 | 9.4% | 2 |
| Embodiment 4 | LFP + LMO | 5:95 | 3.2% | 2.1 | LFP + LMO | 12.5:87.5 | 8.1% | 2 |
| Embodiment 5 | LFP + LTO | 5:95 | 5.5% | 2.1 | LFP + LTO | 12.5:87.5 | 13.6% | 2 |
| Comparative example 1 | NCM | 0:100 | 0 | 2.1 | LFP | 0:100 | 0 | 2 |
| Comparative example 2 | NCM | 0:100 | 0 | 2.1 | NCM | 0:100 | 0 | 2 |
| Comparative example 3 | NCM + LFP | 37.5:62.5 | 28.3% | 2.1 | NCM + LFP | 22.5:77.5 | 16.1% | 2 |

TABLE 2-continued

| | | Battery Pack | | | | | | | |
|---|---|---|---|---|---|---|---|---|---|
| | | Third area<br>Third battery Cell | | | Fourth area<br>Fourth battery Cell | | | | |
| | Types of Positive Electrode Active Materials | Mass ratio of the second positive electrode active material to the first positive electrode active material | Percentage C of the discharge capacity corresponding to the second discharge voltage plateau | Discharge cut-off voltage (V) at −20° C. | Types of Positive Electrode Active Materials | Mass ratio of the second positive electrode active material to the first positive electrode active material | Percentage D of the discharge capacity corresponding to the second discharge voltage plateau | Discharge cut-off voltage (V) at −20° C. | Is D > C > B > A? | Battery Pack Performance Total energy retention rate at −20° C. |
| Embodiment 1 | NCM + LFP | 22.5:77.5 | 16.1% | 1.9 | NCM + LFP | 37.5:62.5 | 28.3% | 1.8 | Yes | 95% |
| Embodiment 2 | NCM + LMO | 22.5:77.5 | 10.6% | 1.9 | NCM + LMO | 37.5:62.5 | 19.7% | 1.8 | Yes | 93% |
| Embodiment 3 | NCM + LTO | 22.5:77.5 | 17.4% | 1.9 | NCM + LTO | 37.5:62.5 | 30.3% | 1.8 | Yes | 91% |
| Embodiment 4 | LFP + LMO | 22.5:77.5 | 15.3% | 1.9 | LFP + LMO | 37.5:62.5 | 27.1% | 1.8 | Yes | 89% |
| Embodiment 5 | LFP + LTO | 22.5:77.5 | 24.3% | 1.9 | LFP + LTO | 37.5:62.5 | 39.8% | 1.8 | Yes | 89% |
| Comparative example 1 | LMO | 0:100 | 0 | 1.9 | LTO | 0:100 | 0 | 1.8 | / | 73% |
| Comparative example 2 | NCM | 0:100 | 0 | 1.9 | NCM | 0:100 | 0 | 1.8 | / | 71% |
| Comparative example 3 | NCM + LFP | 12.5:87.5 | 8.6% | 1.9 | NCM + LFP | 5:95 | 3.4% | 1.8 | No | 64% |

According to the results in Table 2 above, it can be seen that in Embodiments 1 to 5, each of the first battery cell, the second battery cell, the third battery cell, and the fourth battery cell has the first discharge voltage plateau and the second discharge voltage plateau, the percentage of the discharge capacity corresponding to the second discharge voltage plateau of the fourth battery cell>the percentage of the discharge capacity corresponding to the second discharge voltage plateau of the third battery cell>the percentage of the discharge capacity corresponding to the second discharge voltage plateau of the second battery cell>the percentage of the discharge capacity corresponding to the second discharge voltage plateau of the first battery cell, and the total energy retention rate of the battery pack at −20° C. reaches 89% to 95%.

However, in Comparative example 1 and Comparative example 2, each of the first battery cell, the second battery cell, the third battery cell, and the fourth battery cell has only one discharge voltage plateau, and the total energy retention rate of the battery pack at −20° C. is only 73% and 71%.

In Comparative example 3, although each of the first battery cell, the second battery cell, the third battery cell, and the fourth battery cell has the first discharge voltage plateau and the second discharge voltage plateau, the percentage of the discharge capacity corresponding to the second discharge voltage plateau of the fourth battery cell<the percentage of the discharge capacity corresponding to the second discharge voltage plateau of the third battery cell<the percentage of the discharge capacity corresponding to the second discharge voltage plateau of the second battery cell<the percentage of the discharge capacity corresponding to the second discharge voltage plateau of the first battery cell, and the total energy retention rate of the battery pack at −20° C. is only 64%.

TABLE 3

| | | Battery Pack | | | | | | |
|---|---|---|---|---|---|---|---|---|
| | | First area<br>First battery cell | | | | Second area<br>Second battery cell | | |
| | Types of Positive Electrode Active Materials | Mass ratio of the second positive electrode active material to the first positive electrode active material | Percentage A of the discharge capacity corresponding to the second discharge voltage plateau | Discharge cut-off voltage (V) at −20° C. | Types of Positive Electrode Active Materials | Mass ratio of the second positive electrode active material to the first positive electrode active material | Percentage B of the discharge capacity corresponding to the second discharge voltage plateau | Discharge cut-off voltage (V) at −20° C. |
| Embodiment 1 | NCM + LFP | 5:95 | 3.4% | 2.1 | NCM + LFP | 12.5:87.5 | 8.6% | 2 |
| Embodiment 6 | NCM + LFP | 2.5:97.5 | 1.7% | 2.1 | NCM + LFP | 12.5:87.5 | 8.6% | 2 |

TABLE 3-continued

| | | | | | | | | |
|---|---|---|---|---|---|---|---|---|
| Embodiment 7 | NCM + LMO | 2.5:97.5 | 1% | 2.1 | NCM + LMO | 12.5:87.5 | 5.5% | 2 |
| Embodiment 8 | NCM + LTO | 2.5:97.5 | 1.8% | 2.1 | NCM + LTO | 12.5:87.5 | 9.4% | 2 |
| Embodiment 9 | LFP + LMO | 2.5:97.5 | 1.6% | 2.1 | LFP + LMO | 12.5:87.5 | 8.1% | 2 |
| Embodiment 10 | LFP + LTO | 2.5:97.5 | 2.8% | 2.1 | LFP + LTO | 12.5:87.5 | 13.6% | 2 |
| Embodiment 11 | NCM + LTO | 55:45 | 46% | 2.1 | NCM + LTO | 65:35 | 53% | 1.8 |
| Embodiment 12 | NCM + LTO | 0.5:99.5 | 0.8% | 2.1 | NCM + LTO | 1:99 | 1.2% | 1.8 |

Battery Pack

| | Third area Third battery cell | | | | Fourth area Fourth battery cell | | | |
|---|---|---|---|---|---|---|---|---|
| | Types of Positive Electrode Active Materials | Mass ratio of the second positive electrode active material to the first positive electrode active material | Percentage C of the discharge capacity corresponding to the second discharge voltage plateau | Discharge cut-off voltage (V) at −20° C. | Types of Positive Electrode Active Materials | Mass ratio of the second positive electrode active material to the first positive electrode active material | Percentage D of the discharge capacity corresponding to the second discharge voltage plateau | Discharge cut-off voltage (V) at −20° C. |
| Embodiment 1 | NCM + LFP | 22.5:77.5 | 16.1% | 1.9 | NCM + LFP | 37.5:62.5 | 28.3% | 1.8 |
| Embodiment 6 | NCM + LFP | 22.5:77.5 | 16.1% | 1.9 | NCM + LFP | 50:50 | 39.6% | 1.8 |
| Embodiment 7 | NCM + LMO | 22.5:77.5 | 10.6% | 1.9 | NCM + LMO | 50:50 | 29% | 1.8 |
| Embodiment 8 | NCM + LTO | 22.5:77.5 | 17.4% | 1.9 | NCM + LTO | 50:50 | 42% | 1.8 |
| Embodiment 9 | LFP + LMO | 22.5:77.5 | 15.3% | 1.9 | LFP + LMO | 50:50 | 38.3% | 1.8 |
| Embodiment 10 | LFP + LTO | 22.5:77.5 | 24.3% | 1.9 | LFP + LTO | 50:50 | 47.5% | 1.8 |
| Embodiment 11 | NCM + LTO | 65:35 | 53% | 1.9 | NCM + LTO | 65:35 | 53% | 1.8 |
| Embodiment 12 | NCM + LTO | 1.5:98.5 | 1.4% | 1.9 | NCM + LTO | 2:98 | 1.6% | 1.8 |

Battery Pack

| | Is D > C > B > A? | Difference between voltages (V) in the two discharge voltage plateaus of the first battery cell | Difference between voltages (V) in the two discharge voltage plateaus of the second battery cell | Difference between voltages (V) in the two discharge voltage plateaus of the third battery cell | Difference between voltages (V) in the two discharge voltage plateaus of the fourth battery cell | Battery Pack Performance Total energy retention rate at −20° C. |
|---|---|---|---|---|---|---|
| Embodiment 1 | Yes | 0.4 | 0.37 | 0.33 | 0.32 | 95% |
| Embodiment 6 | Yes | 0.400 | 0.370 | 0.33 | 0.30 | 88% |
| Embodiment 7 | Yes | 0.450 | 0.420 | 0.400 | 0.35 | 85% |
| Embodiment 8 | Yes | 0.600 | 0.570 | 0.550 | 0.50 | 86% |
| Embodiment 9 | Yes | 0.350 | 0.320 | 0.290 | 0.25 | 84% |
| Embodiment 10 | Yes | 0.400 | 0.370 | 0.350 | 0.30 | 83% |
| Embodiment 11 | Yes | 0.14 | 0.13 | 0.12 | 0.10 | 63% |
| Embodiment 12 | Yes | 0.74 | 0.73 | 0.72 | 0.70 | 71% |

Note:
In the table above, the "difference between voltages in the two discharge voltage plateaus of the first battery cell" is a difference between a minimum discharge voltage in the first discharge voltage plateau and a maximum discharge voltage in the second discharge voltage plateau of the first battery cell, the "difference between voltages in the two discharge voltage plateaus of the second battery cell" is a difference between a minimum discharge voltage in the first discharge voltage plateau and a maximum discharge voltage in the second discharge voltage plateau of the second battery cell, the "difference between voltages in the two discharge voltage plateaus of the third battery cell" is a difference between a minimum discharge voltage in the first discharge voltage plateau and a maximum discharge voltage in the second discharge voltage plateau of the third battery cell, and the "difference between voltages in the two discharge voltage plateaus of the fourth battery cell" is a difference between a minimum discharge voltage in the first discharge voltage plateau and a maximum discharge voltage in the second discharge voltage plateau of the fourth battery cell.

According to the results in Table 3 above, it can be seen that in Embodiments 1 and 6 to 10, each of the first battery cell, the second battery cell, the third battery cell, and the fourth battery cell has the first discharge voltage plateau and the second discharge voltage plateau, the percentage of the discharge capacity corresponding to the second discharge voltage plateau of the fourth battery cell>the percentage of the discharge capacity corresponding to the second discharge voltage plateau of the third battery cell>the percentage of the discharge capacity corresponding to the second discharge voltage plateau of the second battery cell>the percentage of the discharge capacity corresponding to the second discharge voltage plateau of the first battery cell, the difference between the minimum discharge voltage in the first discharge voltage plateau and the maximum discharge voltage in the second discharge voltage plateau of each of the first battery cell, the second battery cell, the third battery cell, and the fourth battery cell ranges from 0.25 V to 0.6 V, and the total energy retention rate of the battery pack at −20° C. reaches 83% to 95%.

However, in Embodiment 11, the difference between the minimum discharge voltage in the first discharge voltage plateau and the maximum discharge voltage in the second discharge voltage plateau of each of the first battery cell, the second battery cell, the third battery cell, and the fourth battery cell is less than 0.25 V, and the total energy retention rate of the battery pack at −20° C. is 63%.

In Embodiment 12, the difference between the minimum discharge voltage in the first discharge voltage plateau and the maximum discharge voltage in the second discharge voltage plateau of each of the first battery cell, the second battery cell, the third battery cell, and the fourth battery cell is greater than 0.6 V, and the total energy retention rate of the battery pack at −20° C. is 71%.

TABLE 4

| | Battery Pack | | | | | | | |
|---|---|---|---|---|---|---|---|---|
| | First area First battery cell | | | | Second area Second battery cell | | | |
| | Types of Positive Electrode Active Materials | Mass ratio of the second positive electrode active material to the first positive electrode active material | Percentage A of the discharge capacity corresponding to the second discharge voltage plateau | Discharge cut-off voltage (V) at −20° C. | Types of Positive Electrode Active Materials | Mass ratio of the second positive electrode active material to the first positive electrode active material | Percentage B of the discharge capacity corresponding to the second discharge voltage plateau | Discharge cut-off voltage (V) at −20° C. |
| Embodiment 1 | NCM + LFP | 5:95 | 3.4% | 2.1 | NCM + LFP | 12.5:87.5 | 8.6% | 2 |
| Embodiment 13 | NCM + LMO | 2.5:97.5 | 1% | 2.1 | NCM + LMO | 7.5:92.5 | 3.2% | 2 |
| Embodiment 14 | NCM + LMO | 2.5:97.5 | 1% | 2.1 | NCM + LMO | 7.5:92.5 | 3.2% | 2 |
| Embodiment 15 | LFP + LTO | 7.5:92.5 | 8.2% | 2.1 | LFP + LTO | 22.5:77.5 | 24.3% | 2 |
| Embodiment 16 | LFP + LTO | 22.5:77.5 | 24.3% | 2.1 | LFP + LTO | 60:40 | 56% | 2 |

| | Battery Pack | | | | | | | | | |
|---|---|---|---|---|---|---|---|---|---|---|
| | Third area Third battery cell | | | | Fourth area Fourth battery cell | | | | | |
| | Types of Positive Electrode Active Materials | Mass ratio of the second positive electrode active material to the first positive electrode active material | Percentage C of the discharge capacity corresponding to the second discharge voltage plateau | Discharge cut-off voltage (V) at −20° C. | Types of Positive Electrode Active Materials | Mass ratio of the second positive electrode active material to the first positive electrode active material | Percentage D of the discharge capacity corresponding to the second discharge voltage plateau | Discharge cut-off voltage (V) at −20° C. | Is D > C > B > A? | Battery Pack Performance Total energy retention rate at −20° C. |
| Embodiment 1 | NCM + LFP | 22.5:77.5 | 16.1% | 1.9 | NCM + LFP | 37.5:62.5 | 28.3% | 1.8 | Yes | 95% |
| Embodiment 13 | NCM + LMO | 22.5:77.5 | 10.6% | 1.9 | NCM + LMO | 37.5:62.5 | 19.7% | 1.8 | Yes | 88% |
| Embodiment 14 | LFP + LTO | 37.5:62.5 | 39.8% | 1.9 | LFP + LTO | 50:50 | 47.5% | 1.8 | Yes | 84% |
| Embodiment 15 | LFP + LTO | 37.5:62.5 | 39.8% | 1.9 | LFP + LTO | 50:50 | 47.5% | 1.8 | Yes | 86% |
| Embodiment 16 | LFP + LTO | 50:50 | 47.5% | 1.8 | LFP + LTO | 50:50 | 47.5% | 1.8 | Yes | 60% |

According to the results in Table 4 above, it can be seen that in Embodiments 1 and 13 to 15, each of the first battery cell, the second battery cell, the third battery cell, and the fourth battery cell has the first discharge voltage plateau and the second discharge voltage plateau, the percentage of the discharge capacity corresponding to the second discharge voltage plateau of the fourth battery cell>the percentage of the discharge capacity corresponding to the second discharge voltage plateau of the third battery cell>the percentage of the discharge capacity corresponding to the second discharge voltage plateau of the second battery cell>the percentage of the discharge capacity corresponding to the second discharge voltage plateau of the first battery cell, the mass percentage of the second positive electrode active material and the percentage of the discharge capacity corresponding to the second discharge voltage plateau of each of the first battery cell, the second battery cell, the third battery cell, and the fourth battery cell are respectively within preferred ranges specified in the present application, and the total energy retention rate of the battery pack at −20° C. reaches 84% to 95%.

However, in Embodiment 16, the mass percentage of the second positive electrode active material and the percentage of the discharge capacity corresponding to the second discharge voltage plateau of each of the first battery cell, the second battery cell, and the third battery cell are respectively beyond preferred ranges specified in the present application, and the total energy retention rate of the battery pack at −20° C. is 60%.

TABLE 5

| | Battery Pack | | | | | | |
|---|---|---|---|---|---|---|---|
| | First area First battery cell | | | | Second area Second battery cell | | |
| | Types of Positive Electrode Active Materials | Mass ratio of the second positive electrode active material to the first positive electrode active material | Percentage A of the discharge capacity corresponding to the second discharge voltage plateau | Discharge cut-off voltage (V) at −20° C. | Types of Positive Electrode Active Materials | Mass ratio of the second positive electrode active material to the first positive electrode active material | Percentage B of the discharge capacity corresponding to the second discharge voltage plateau | Discharge cut-off voltage (V) at −20° C. |
| Embodiment 1 | NCM + LFP | 5:95 | 3.4% | 2.1 | NCM + LFP | 12.5:87.5 | 8.6% | 2 |
| Embodiment 17 | NCM + LFP | 5:95 | 3.4% | 2.1 | NCM + LFP | 12.5:87.5 | 8.6% | 2.1 |
| Embodiment 18 | NCM + LFP | 5:95 | 3.4% | 1.6 | NCM + LFP | 12.5:87.5 | 8.6% | 1.6 |
| Embodiment 19 | NCM + LFP | 5:95 | 3.4% | 1.8 | NCM + LFP | 12.5:87.5 | 8.6% | 2.1 |
| Embodiment 20 | NCM + LFP | 5:95 | 3.4% | 1.8 | NCM + LFP | 12.5:87.5 | 8.6% | 1.9 |
| Embodiment 21 | NCM + LFP | 5:95 | 3.4% | 1.8 | NCM + LFP | 12.5:87.5 | 8.6% | 1.9 |
| Embodiment 22 | NCM + LFP | 5:95 | 3.4% | 1.5 | NCM + LFP | 12.5:87.5 | 8.6% | 1.4 |
| Embodiment 23 | NCM + LFP | 5:95 | 3.4% | 2.8 | NCM + LFP | 12.5:87.5 | 8.6% | 2.6 |

| | Battery Pack | | | | | | | | |
|---|---|---|---|---|---|---|---|---|---|
| | Third area Third battery cell | | | | Fourth area Fourth battery cell | | | | |
| | Types of Positive Electrode Active Materials | Mass ratio of the second positive electrode active material to the first positive electrode active material | Percentage C of the discharge capacity corresponding to the second discharge voltage plateau | Discharge cut-off voltage (V) at −20° C. | Types of Positive Electrode Active Materials | Mass ratio of the second positive electrode active material to the first positive electrode active material | Percentage D of the discharge capacity corresponding to the second discharge voltage plateau | Discharge cut-off voltage (V) at −20° C. | Is D > C > B > A? | Battery Pack Performance Toal energy retention rate at −20° C. |
| Embodiment 1 | NCM + LFP | 22.5:77.5 | 16.1% | 1.9 | NCM + LFP | 37.5:62.5 | 28.3% | 1.8 | Yes | 95% |
| Embodiment 17 | NCM + LFP | 22.5:77.5 | 16.1% | 2.1 | NCM + LFP | 37.5:62.5 | 28.3% | 2.1 | Yes | 87% |
| Embodiment 18 | NCM + LFP | 22.5:77.5 | 16.1% | 1.6 | NCM + LFP | 37.5:62.5 | 28.3% | 1.6 | Yes | 96% |
| Embodiment 19 | NCM + LFP | 22.5:77.5 | 16.1% | 2.1 | NCM + LFP | 37.5:62.5 | 28.3% | 2.1 | Yes | 75% |
| Embodiment 20 | NCM + LFP | 22.5:77.5 | 16.1% | 2.1 | NCM + LFP | 37.5:62.5 | 28.3% | 2.1 | Yes | 73% |
| Embodiment 21 | NCM + LFP | 22.5:77.5 | 16.1% | 2 | NCM + LFP | 37.5:62.5 | 28.3% | 2.1 | Yes | 73% |
| Embodiment 22 | NCM + LFP | 22.5:77.5 | 16.1% | 1.3 | NCM + LFP | 37.5:62.5 | 28.3% | 1.2 | Yes | 86% |
| Embodiment 23 | NCM + LFP | 22.5:77.5 | 16.1% | 2.5 | NCM + LFP | 37.5:62.5 | 28.3% | 2.4 | Yes | 65% |

According to the results in Table 5 above, it can be seen that in Embodiments 1, 17 and 18, each of the first battery cell, the second battery cell, the third battery cell, and the fourth battery cell has the first discharge voltage plateau and the second discharge voltage plateau, the percentage of the discharge capacity corresponding to the second discharge voltage plateau of the fourth battery cell>the percentage of the discharge capacity corresponding to the second discharge voltage plateau of the third battery cell>the percentage of the discharge capacity corresponding to the second discharge voltage plateau of the second battery cell>the percentage of the discharge capacity corresponding to the second discharge voltage plateau of the first battery cell, a difference between the discharge cut-off voltage of the first battery cell and the discharge cut-off voltage of the second battery cell, a difference between the discharge cut-off voltage of the second battery cell and the discharge cut-off voltage of the third battery cell, a difference between the discharge cut-off voltage of the third battery cell and the discharge cut-off voltage of the fourth battery cell, and the discharge cut-off voltage of the fourth battery cell at −20° C. are respectively within preferred ranges specified in the present application, and the total energy retention rate of the battery pack at −20° C. reaches 87% to 96%.

In Embodiment 19, the discharge cut-off voltage of the second battery cell is greater than the discharge cut-off voltage of the first battery cell at −20° C., and the total energy retention rate of the battery pack at −20° C. is 75%.

In Embodiment 20, the discharge cut-off voltage of the third battery cell>the discharge cut-off voltage of the second battery cell>the discharge cut-off voltage of the first battery cell at −20° C., and the total energy retention rate of the battery pack at −20° C. is 73%.

In Embodiment 21, the discharge cut-off voltage of the fourth battery cell>the discharge cut-off voltage of the third battery cell>the discharge cut-off voltage of the second battery cell>the discharge cut-off voltage of the first battery cell at −20° C., and the total energy retention rate of the battery pack at −20° C. is 73%.

In Embodiment 22, the discharge cut-off voltage of the first battery cell, the discharge cut-off voltage of the second battery cell, the discharge cut-off voltage of the third battery cell, and the discharge cut-off voltage of the fourth battery cell are too low at −20° C., and although the total energy retention rate of the battery pack at −20° C. reaches 88%, the cycling performance of the battery cells may be damaged as described above.

In Embodiment 23, although the difference between the discharge cut-off voltage of the first battery cell and the discharge cut-off voltage of the second battery cell, the difference between the discharge cut-off voltage of the second battery cell and the discharge cut-off voltage of the third battery cell, and the difference between the discharge cut-off voltage of the third battery cell and the discharge cut-off voltage of the fourth battery cell at −20° C. are respectively within preferred ranges specified in the present application, the discharge cut-off voltages of the first battery cell, the second battery cell, the third battery cell, and the fourth battery cell at −20° C. are too high, and the total energy retention rate of the battery pack at −20° C. is 65%.

It should be noted that the present application is not limited to the above implementations. The above implementations are exemplary only, and any implementation that has substantially same constitutions as the technical ideas and has the same effects within the scope of the technical solution of the present application falls within the technical scope of the present application. In addition, without departing from the gist of the present application, various modifications that can be conceived by those skilled in the art to the implementations, and other modes constructed by combining some of the constituent elements of the implementations also fall within the scope of the present application.

The invention claimed is:

1. A battery pack, comprising a battery pack case and battery cells accommodated in the battery pack case, wherein
   in a top view, an inner space of the battery pack case is in a rectangular shape;
   the inner space of the battery pack case includes a first area, a second area, a third area, and a fourth area, in the top view, the first area is located at a center of the rectangular shape of the inner space, the fourth area is located at four corners of the rectangular shape of the inner space, the third area is located on four sides of the rectangular shape of the inner space except the corners, and the second area is located between the first area and the third area;
   a first battery cell is provided in the first area, a second battery cell is provided in the second area, a third battery cell is provided in the third area, and a fourth battery cell is provided in the fourth area;
   in the top view, the second battery cell is not in contact with any inner surface of the battery pack case, the third battery cell is in contact with only one inner surface of the battery pack case, and the fourth battery cell is in contact with two inner surfaces of the battery pack case;
   the first battery cell, the second battery cell, the third battery cell, and the fourth battery cell each have a first discharge voltage plateau and a second discharge voltage plateau, and an average discharge voltage in the first discharge voltage plateau is higher than an average discharge voltage in the second discharge voltage plateau; and
   in each of the first battery cell, the second battery cell, the third battery cell, and the fourth battery cell, under a condition that a sum of a discharge capacity corresponding to the first discharge voltage plateau and a discharge capacity corresponding to the second discharge voltage plateau is 100%, a percentage of the discharge capacity corresponding to the second discharge voltage plateau of the fourth battery cell>a percentage of the discharge capacity corresponding to the second discharge voltage plateau of the third battery cell>a percentage of the discharge capacity corresponding to the second discharge voltage plateau of the second battery cell>a percentage of the discharge capacity corresponding to the second discharge voltage plateau of the first battery cell.

2. The battery pack according to claim 1, wherein
   in each of the first battery cell, the second battery cell, the third battery cell, and the fourth battery cell, a difference between a minimum discharge voltage in the first discharge voltage plateau and a maximum discharge voltage in the second discharge voltage plateau ranges from 0.25 V to 0.6 V.

3. The battery pack according to claim 1, wherein
   in the first battery cell, under a condition that the sum of the discharge capacity corresponding to the first discharge voltage plateau and the discharge capacity corresponding to the second discharge voltage plateau is 100%, the discharge capacity corresponding to the first discharge voltage plateau accounts for 91.8% to 99%, and the discharge capacity corresponding to the second discharge voltage plateau accounts for 1% to 8.2%.

4. The battery pack according to claim 1, wherein
   in the second battery cell, under a condition that the sum of the discharge capacity corresponding to the first discharge voltage plateau and the discharge capacity corresponding to the second discharge voltage plateau is 100%, the discharge capacity corresponding to the first discharge voltage plateau accounts for 75.7% to 96.8%, and the discharge capacity corresponding to the second discharge voltage plateau accounts for 3.2% to 24.3%.

5. The battery pack according to claim 1, wherein
   in the third battery cell, under a condition that the sum of the discharge capacity corresponding to the first discharge voltage plateau and the discharge capacity corresponding to the second discharge voltage plateau is 100%, the discharge capacity corresponding to the first discharge voltage plateau accounts for 60.2% to 89.4%, and the discharge capacity corresponding to the second discharge voltage plateau accounts for 10.6% to 39.8%.

6. The battery pack according to claim 1, wherein in the fourth battery cell, under a condition that the sum of the discharge capacity corresponding to the first discharge voltage plateau and the discharge capacity corresponding to the second discharge voltage plateau is 100%, the discharge capacity corresponding to the first discharge voltage plateau accounts for 52.5% to 80.3%, and the discharge capacity corresponding to the second discharge voltage plateau accounts for 19.7% to 47.5%.

7. The battery pack according to claim 1, wherein a positive electrode active material of each of the first battery cell, the second battery cell, the third battery cell, and the fourth battery cell is formed by mixing a first positive electrode active material with the first discharge voltage plateau and a second positive electrode active material with the second discharge voltage plateau.

8. The battery pack according to claim 7, wherein each of the first positive electrode active material and the second positive electrode active material comprises at least one selected from the group consisting of lithium nickelate, lithium cobalt oxide, lithium nickel manganese cobalt oxide, lithium nickel cobalt aluminium oxide, lithium iron phosphate, lithium manganese oxide, lithium titanate, and manganese dioxide.

9. The battery pack according to claim 7, wherein the first positive electrode active material is lithium nickel manganese cobalt oxide, and the second positive electrode active material is lithium iron phosphate; or the first positive electrode active material is lithium nickel manganese cobalt oxide, and the second positive electrode active material is lithium manganese oxide or lithium titanate; or the first positive electrode active material is lithium iron phosphate, and the second positive electrode active material is lithium manganese oxide or lithium titanate.

10. The battery pack according to claim 7, wherein under a condition that the first positive electrode active materials and the second positive electrode active materials in the first battery cell, the second battery cell, the third battery cell, and the fourth battery cell are both of the same type, respective mass percentages of the first positive electrode active materials in the positive electrode active materials of the first battery cell, the second battery cell, the third battery cell, and the fourth battery cell decrease successively, and respective mass percentages of the second positive electrode active materials in the positive electrode active materials of the first battery cell, the second battery cell, the third battery cell, and the fourth battery cell increase successively.

11. The battery pack according to claim 7, wherein in the first battery cell, under a condition that a total mass of the first positive electrode active material and the second positive electrode active material is 100%, a mass of the first positive electrode active material accounts for 92.5% to 97.5%, and a mass of the second positive electrode active material accounts for 2.5% to 7.5%.

12. The battery pack according to claim 7, wherein in the second battery cell, under a condition that a total mass of the first positive electrode active material and the second positive electrode active material is 100%, a mass of the first positive electrode active material accounts for 77.5% to 92.5%, and a mass of the second positive electrode active material accounts for 7.5% to 22.5%.

13. The battery pack according to claim 7, wherein in the third battery cell, under a condition that a total mass of the first positive electrode active material and the second positive electrode active material is 100%, a mass of the first positive electrode active material accounts for 62.5% to 77.5%, and a mass of the second positive electrode active material accounts for 22.5% to 37.5%.

14. The battery pack according to claim 7, wherein in the fourth battery cell, under a condition that a total mass of the first positive electrode active material and the second positive electrode active material is 100%, a mass of the first positive electrode active material accounts for 50% to 62.5%, and a mass of the second positive electrode active material accounts for 37.5% to 50%.

15. The battery pack according to claim 9, wherein under a condition that the first positive electrode active material is lithium nickel manganese cobalt oxide, and the second positive electrode active material is lithium iron phosphate, a mass ratio of the second positive electrode active material in the first battery cell to that in the second battery cell, that in the third battery cell, and that in the fourth battery cell is 1: (1-3):(3-5):(5-9); under a condition that the first positive electrode active material is lithium nickel manganese cobalt oxide, and the second positive electrode active material is lithium titanate or lithium manganese oxide, a mass ratio of the second positive electrode active material in the first battery cell to that in the second battery cell, that in the third battery cell, and that in the fourth battery cell is 1:(1-2):(3-4):(5-7); and under a condition that the first positive electrode active material is lithium iron phosphate, and the second positive electrode active material is lithium titanate or lithium manganese oxide, a mass ratio of the second positive electrode active material in the first battery cell to that in the second battery cell, that in the third battery cell, and that in the fourth battery cell is 1:(1-3):(3-5):(5-9).

16. The battery pack according to claim 1, wherein at a temperature below 0° C., a discharge cut-off voltage of the first battery cell is higher than a discharge cut-off voltage of the second battery cell by 0 V to 0.3 V, the discharge cut-off voltage of the second battery cell is higher than a discharge cut-off voltage of the third battery cell by 0 V to 0.3 V, the discharge cut-off voltage of the third battery cell is higher than a discharge cut-off voltage of the fourth battery cell by 0 V to 0.3 V, and the discharge cut-off voltage of the fourth battery cell is 1.6 V or more.

17. The battery pack according to claim 1, wherein a plurality of first battery cells comprising the first battery cell is provided in the first area, a plurality of second battery cells comprising the second battery cell is provided in the second area, a plurality of third battery cells comprising the third battery cell is provided in the third area, and a plurality of fourth battery cells comprising the fourth battery cell is provided in the fourth area, and a ratio of a number of the first battery cells to that of the second battery cells, that of the third battery cells, and that of the fourth battery cells is (3-8):(8-13):(9-14): 1.

18. The battery pack according to claim 1, wherein capacitors are provided in gaps between different battery cells.

19. A power consuming device, comprising the battery pack according to claim 1.

20. The power consuming device of claim 19, wherein the power consuming device includes a mobile device, an electric vehicle, an electric train, a ship, a satellite, or an energy storage system.

* * * * *